(12) United States Patent
Hayden et al.

(10) Patent No.: US 12,112,363 B2
(45) Date of Patent: Oct. 8, 2024

(54) PROPERTY DATA AGGREGATION AND EVALUATION TOOL

(71) Applicant: Renlight Incorporated, Santaquin, UT (US)

(72) Inventors: Austin Hayden, Santaquin, UT (US); Jeremiah Holms Maughan, Mapleton, UT (US); Anthony David Fonseca, Saratoga Springs, UT (US)

(73) Assignee: RENLIGHT INCORPORATED, Santaquin, UT (US)

( * ) Notice: Subject to any disclaimer, the term of this patent is extended or adjusted under 35 U.S.C. 154(b) by 562 days.

(21) Appl. No.: 17/205,864

(22) Filed: Mar. 18, 2021

(65) Prior Publication Data
US 2021/0295408 A1    Sep. 23, 2021

Related U.S. Application Data

(60) Provisional application No. 62/991,417, filed on Mar. 18, 2020.

(51) Int. Cl.
| | |
|---|---|
| *G06Q 30/00* | (2023.01) |
| *G06F 16/23* | (2019.01) |
| *G06F 16/2457* | (2019.01) |
| *G06Q 30/0601* | (2023.01) |
| *G06Q 50/163* | (2024.01) |
| *G06F 9/54* | (2006.01) |

(52) U.S. Cl.
CPC ..... *G06Q 30/0629* (2013.01); *G06F 16/2379* (2019.01); *G06F 16/24578* (2019.01); *G06Q 50/163* (2013.01); *G06F 9/541* (2013.01)

(58) Field of Classification Search
None
See application file for complete search history.

(56) References Cited

U.S. PATENT DOCUMENTS

| | | |
|---|---|---|
| 8,775,322 B2 | 7/2014 | Heyer |
| 8,832,115 B2 | 9/2014 | Smintina |
| 10,395,288 B2 | 8/2019 | Case |
| 10,769,156 B2 * | 9/2020 | Taylor ................. G06F 16/9538 |
| 2007/0043770 A1 | 2/2007 | Goodrich |
| 2013/0218864 A1 * | 8/2013 | Hong ..................... G06Q 50/16 |
| | | 707/E17.108 |

(Continued)

FOREIGN PATENT DOCUMENTS

AU    2009280919 B2    2/2013

*Primary Examiner* — Mila Airapetian
(74) *Attorney, Agent, or Firm* — VLP Law Group LLP; Michel Bohn

(57) ABSTRACT

A data aggregation and evaluation tool for property evaluation is described. In an example implementation, the system may receive a first user input indicating a preference for a set of attributes via graphical user interface, generate a set of queries associated with the set of attributes, and provide the set of queries to the user via the graphical user interface. The system may receive a second user input to the set of queries and may determine a weight associated with an attribute based on the second input. The system may receive data describing an attribute value of the attribute for a property, score the property using the weight and the attribute value, and alter the graphical user interface based on the score.

20 Claims, 34 Drawing Sheets

(56) References Cited

U.S. PATENT DOCUMENTS

2014/0316949 A1\* 10/2014 Copley ................. G06Q 50/16
                                                    705/26.63
2018/0033102 A1   2/2018 Duault
2021/0142430 A1\*  5/2021 Xu ........................ G06Q 50/16

\* cited by examiner

402

| Present in House? | Category | Austin Priorities | Possible Points | Points | Priority Weight |
|---|---|---|---|---|---|
| | | House A | | | |
| Yes | Must Have | 3+ Bedrooms | 4 | 4 | 11.10% |
| Yes | Must Have | 2+ Bathrooms | 4 | 4 | 11.10% |
| | Must Have | Washer/Dryer | 4 | 0 | 11.10% |
| Yes | Must Have | Dishwasher | 4 | 4 | 11.10% |
| | Love to Have | Pantry: Medium | 2 | 0 | 5.60% |
| Yes | Love to Have | 2 Car Garage | 2 | 2 | 5.60% |
| | Love to Have | Master bath | 2 | 0 | 5.60% |
| Yes | Love to Have | Fenced backyard | 2 | 2 | 5.60% |
| Yes | Love to Have | Custom: Counterspace | 2 | 2 | 5.60% |
| Yes | Love to Have | Dated condition | 2 | 2 | 5.60% |
| Yes | Love to Have | Mother-in-law suite | 2 | 2 | 5.60% |
| | Like to Have | Basement: unfinished | 1 | 0 | 2.80% |
| Yes | Like to Have | open layout | 1 | 1 | 2.80% |
| Yes | Like to Have | Floorplan: not multilevel | 1 | 1 | 2.80% |
| | Like to Have | No HOA | 1 | 0 | 2.80% |
| Yes | Like to Have | Central Air | 1 | 1 | 2.80% |
| Yes | Like to Have | 20 Minutes from Work | 1 | 1 | 2.80% |
| Comment | | positive comment | 0 | 0 | 0.00% |
| Comment | | negative comment | 0 | 0 | 0.00% |
| Comment | | positive comment | 0 | 0 | 0.00% |
| Comment | | neutral comment | 0 | 0 | 0.00% |
| | | total possible | 36 | | |
| | | total points | | 26 | |
| | | Homefit Score | | 7.2 | |

Figure 4A

| House B | | | | | |
|---|---|---|---|---|---|
| Present in House? | Category | Austin Priorities | Possible Points | Points | Priority Weight |
| Yes | Must Have | 3+ Bedrooms | 4 | 4 | 11.10% |
| Yes | Must Have | 2+ Bathrooms | 4 | 4 | 11.10% |
|  | Must Have | Washer/Dryer | 4 | 0 | 11.10% |
| Yes | Must Have | Dishwasher | 4 | 4 | 11.10% |
|  | Love to Have | Pantry: Medium | 2 | 0 | 5.60% |
| Yes | Love to Have | 2 Car Garage | 2 | 2 | 5.60% |
| Yes | Love to Have | Master bath | 2 | 2 | 5.60% |
| Yes | Love to Have | Fenced backyard | 2 | 2 | 5.60% |
| Yes | Love to Have | Custom: Counterspace | 2 | 2 | 5.60% |
|  | Love to Have | Dated condition | 2 | 0 | 5.60% |
| Yes | Love to Have | Mother-in-law suite | 2 | 2 | 5.60% |
| Yes | Like to Have | Basement: unfinished | 1 | 1 | 2.80% |
| Yes | Like to Have | open layout | 1 | 1 | 2.80% |
| Yes | Like to Have | Floorplan: not multilevel | 1 | 1 | 2.80% |
|  | Like to Have | No HOA | 1 | 0 | 2.80% |
| Yes | Like to Have | Central Air | 1 | 1 | 2.80% |
| Yes | Like to Have | 20 Minutes from Work | 1 | 1 | 2.80% |
| Comment | | positive comment | 0 | 1 | 2.80% |
| Comment | | negative comment | 0 | -1 | -2.80% |
| Comment | | negative comment | 0 | -1 | -2.80% |
| Comment | | negative comment | 0 | -1 | -2.80% |
| Comment | | negative comment | 0 | -1 | -2.80% |
| Comment | | neutral comment | 0 | 0 | 0.00% |
| Comment | | positive comment | 0 | 1 | 2.80% |
| Comment | | neutral comment | 0 | 0 | 0.00% |
|  |  | total possible | 36 |  |  |
|  |  | total points |  | 25 |  |
|  |  | Homefit Score |  | 6.9 |  |

PROPERTY DATA AGGREGATION AND EVALUATION TOOL

BACKGROUND

The present disclosure relates to decision-matrix systems and, more particularly, relates to utilizing user generated real property data to arrive at decisions. Some implementations relate to an adaptable mobile graphical user interface for evaluating properties against one another.

Previously, individuals evaluating real estate were faced with many decisions and conflicting priorities that could not be easily reconciled. Information pertaining to a particular property may be spread across multiple computing devices and databases and is not easily integrated, particularly in a way that simplifies the satisfaction of conflicting priorities. For example, previously, a real estate agent may have printed a physical copy of a house listing, given it to a client, and expected the client to determine and communicate appropriate information to all relevant parties; however, this solution does not allow seamless integration across multiple parties, nor does it provide an adaptable system for organizing, analyzing, and displaying the most relevant data.

SUMMARY

A property data aggregation and evaluation tool can be configured to perform particular operations or actions by virtue of having software, firmware, hardware, or a combination of them installed on the system that in operation causes or cause the system to perform the actions. One general aspect of the system includes receiving, via a graphical user interface, a first input from a user, the first input indicating a preference for a set of attributes; generating a set of queries associated with the set of attributes based on the preference for the set of attributes including selecting, from the set of attributes, a first attribute and a second attribute for comparison; providing, via the graphical user interface, the set of queries associated with the set of attributes; receiving, via the graphical user interface, a second input to one or more of the set of queries; determining a set of weights associated with the set of attributes based on the second input and the set of queries; receiving data describing one or more attribute values of the set of attributes for one or more properties; scoring a first property of the one or more properties using the set of weights and an attribute value associated with the first property; and altering the graphical user interface to present information pertaining to the first property based on the score of the first property.

Other implementations of one or more of these aspects include corresponding systems, apparatus, computer processors, computer memories, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIGS. 4A and 4B illustrate example priorities, weights, attribute values, and scoring for example properties.

DETAILED DESCRIPTION

Figure 1:
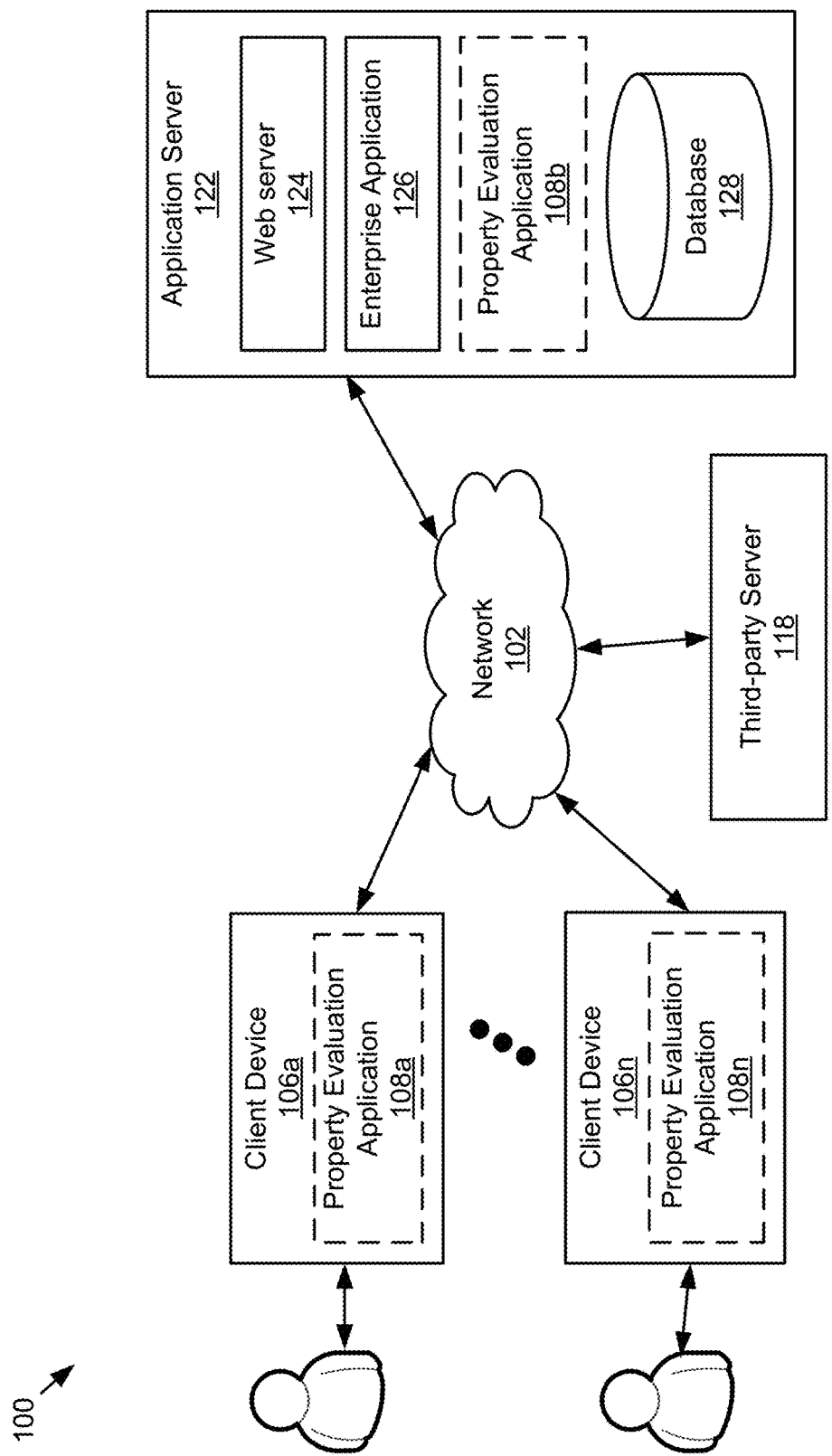
FIG. 1 is a block diagram of an example system for providing a data aggregation and evaluation tool.

The technology disclosed in this application allows stakeholders, such as a real-estate agent, property buyer, property co-buyer, or other individuals involved in an evaluation and purchase process to organize and evaluate attributes of a property. The technology may include one or more computing devices and graphical user interfaces configured to facilitate the evaluation. In some implementations, the technology disclosed in this application allows users to easily and conveniently create their own criteria and use that criteria as a checklist when viewing a property. The technology may also automatically calculate a score for the property, compare properties based on the presence, absence, value, and/or weighting of attributes across a set of properties. Other features, operations, and benefits are described in further detail below.

The disclosure presents an innovative, mobile computing device or web-based tool that collects and determines users' housing preferences, scores potential homes based on the generated criteria utilizing client data input, and electronically records the users' house tour experience. The tool also generates contextual educational content based on users' progress in the buying process. Some implementations of the technology include a method and system for gathering, recording, storing, displaying, tracking, comparing, sharing, communicating, and rating personal data via software while educating the user about upcoming decisions. Also includes ability to record, play, and share explanation videos with other users.

The features and advantages described herein are not all-inclusive and many additional features and advantages are within the scope of the present disclosure. Moreover, it should be noted that the language used in the present disclosure has been principally selected for readability and instructional purposes, and not to limit the scope of the subject matter disclosed herein.

Implementations of the technology described herein provides an efficient and adaptable mobile graphical interface and associated application for identifying and ranking the importance of home criteria/features through pair comparison and manual adjustment of those criteria/features. For instance, the technology may provide the user a tool for aggregating home information gathered during a home tour and automatically scores the home against the previously determined criteria/features.

Implementations of the technology allows users to work through a complex decision-making process in which many factors are compared, thereby helping the users to avoid becoming bogged down in the analysis of the factors and stay focused on priorities. For instance, the technology described herein provides a mobile application that walks a user through determination of priorities, ranking of priorities, evaluation of various objects (e.g., real property), education, calculation of an overall score, and, potentially, a selection of a given object. The mobile application may be a property evaluation application 108 that gathers attributes of properties (e.g., via communication using an application programming interface of a multiple listing service), such as residences/houses, and facilitates prioritization of the attributes (e.g., through a binary comparison) in an easy way. The property evaluation application may weight the results of the comparison, allow specific and unique houses to be evaluated against the priorities, aggregate notes around priorities/attributes, provide education, and potentially objectively score how the house fits the needs of the user, among other operations.

The property evaluation application 108 addresses technological limitations where complex properties are evaluated across a plurality of attributes on a limited size screen with limited processing capabilities of a mobile interface, for example, because typical residential listings and note taking solutions cannot be properly displayed on a mobile display, because the amount of data used to evaluate unique properties typically does not fit onto a mobile interface without substantially reducing the amount of data, among other issues described herein. Unlike using a pen and paper or spreadsheet, the technology allows notes and images to be linked with properties, attributes of the properties, address, various house images, map location, square footage, price per square footage, etc. The property evaluation application may include using priorities as a checklist and may allow a user to add a priority thought of in the moment, a property score, etc. In some instances, the property evaluation application may automatically integrate the notes and images in the computation of scores, automatic ranking of properties, display of information, and other operations described herein.

In some implementations, the property evaluation application 108 may automatically score and weight attributes; integrate evaluation, data aggregation, and/or analysis across a plurality of devices, device types, and user roles; integrate and match specific data from third-party sources; etc. For instance, the property evaluation application may receive, translate, and/or display data from real-estate agents, multiple listing services (MLS), tour appointment scheduling servers, and/or other services. For example, the property evaluation application may include APIs to send data to and receive data from MLS servers, third-party websites (e.g., Pinterest™, Houzz™, Zillow™, etc.), etc. For instance, an MLS listing can be automatically retrieved, scored, and associated with other evaluated properties. Similarly, the property evaluation application may import attributes and preferences from Pinterest, etc. The property evaluation application may use the retrieved data to further inform the score calculation, the graphical interfaces displayed and/or their formatting (e.g., the elements shown or their positions, etc., during the property evaluation or note taking phases described herein), or other operations described herein.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

FIG. 1 is a block diagram of an example system 100 for providing a data aggregation and evaluation tool. The illustrated system 100 may include client devices 106a . . . 106n, which may run instances of the property evaluation application 108a . . . 108n, a third-party server 118, and an application server 122, which are electronically communicatively coupled via a network 102 for interaction with one another, although other system configurations are possible including other devices, systems, and networks. For example, the system 100 could include any number of client devices 106, third-party servers 118, application servers 122, and other systems and devices.

The network 102 may include any number of networks and/or network types. For example, the network 102 may include, but is not limited to, one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

The client device 106 includes one or more computing devices having data processing and communication capabilities. The client device 106 may couple to and communicate with other client devices 106 and the other entities of the system 100 via the network 102 using a wireless and/or wired connection, such as the application server 122. Examples of client devices 106 may include, but are not limited to, mobile phones, wearables, tablets, laptops, desktops, netbooks, server appliances, servers, virtual machines, TVs, etc. The system 100 may include any number of client devices 106, including client devices 106 of the same or different type.

Figure 3A:
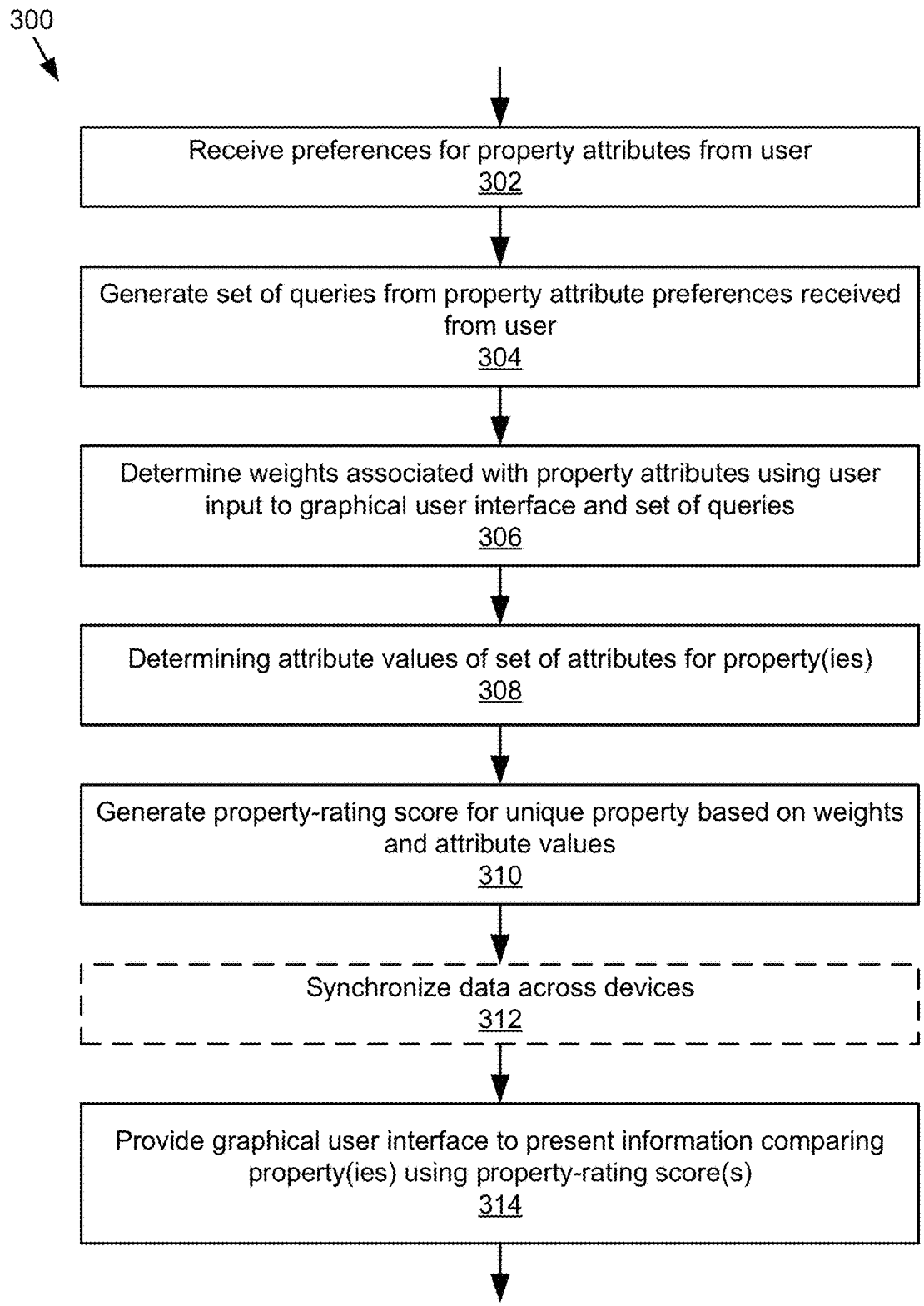
FIG. 3A is a flowchart of an example method for providing a data aggregation and evaluation tool.

A plurality of client devices 106a . . . 106n are depicted in FIG. 1 to indicate that the application server 122 and its components may aggregate information about and provide data associated with the systems and processes described herein to a multiplicity of users on a multiplicity of client devices 106a . . . 106n, for example, as described in reference to the agents, buyers, and co-buyers in FIG. 3A. In some implementations, a single user may use more than one client device 106, which the application server 122 may use to track and aggregate interaction data associated with the user through a variety of different channels including online, physical, and phone (e.g., text, voice, etc.) channels, as discussed elsewhere herein. In some implementations, the application server 122 may communicate with and provide information to a client device 106. For instance, the application server 122 may send data, such as graphical user interfaces, receipts, and confirmation messages, etc., to a property evaluation application 108*a* . . . 108*n* on a client device 106*a* . . . 106*n*.

In some implementations, the property evaluation application may send information to another computing device, for example, to an applications server 122 or third-party server 118. For example, the property evaluation application may determine certain property listings (e.g., based on a ranking, certain features, and/or user selection) and communicate with various devices based on those listings. For instance, the property evaluation application may determine a listing (e.g., a highly ranked listing, as described below), identify one or more open time slots on a calendar of a user, and/or automatically communicate with a computing device, such as a third-party server 118 of a showing scheduling service or MLS. For example, the property evaluation application may communicate with the user's online calendar (e.g., Outlook™ or Google™), a calendar application (e.g., on the client device 106), or by checking available time slots (e.g., entered into the property evaluation application or another calendar).

In some implementations, instances of the property evaluation application may share information, for example, a first user (e.g., a buyer) may be signed into a first instance of the property evaluation application, a second user, an agent (or other administrative role) may be signed into a third instance of the property evaluation application. The property evaluation application may share data directly between devices or via a server (e.g., application server 122) to coordinate scoring, browsing, note taking, etc., on each device. In some instances, the interfaces, options, etc., shown on each instance of the property evaluation application may depend on the role of the user signed in and/or defined permissions, as described in further detail below.

The application server 122 may include a web server 124, an enterprise application 126, a property evaluation application 108, and a database 128. In some configurations, the enterprise application 126 and/or property evaluation application 108*b* may be distributed over the network 102 on disparate devices in disparate locations or may reside on the same locations, in which case the client device 106*a* and/or the application server 122 may each include an instance of the property evaluation application 108 and/or portions thereof. The client devices 106 may also store and/or operate other software such as a property evaluation application 108, an operating system, other applications, etc., that are configured to interact with the application server 122 via the network 102.

The application server 122 and the third-party server 118 have data processing, storing, and communication capabilities, as discussed elsewhere herein. For example, the servers 122 and/or 118 may include one or more hardware servers, server arrays, storage devices and/or systems, etc. In some implementations, the servers 122 and/or 118 may include one or more virtual servers, which operate in a host server environment.

In some implementations, the enterprise application 126 may receive communications from a client device 106 in order to aggregate data, match priorities, determine scores and/or weighting for properties, provide integration across devices or systems, store data, or other functionality described herein. The enterprise application 126 may receive information and provide information to the property evaluation application 108 to generate the adaptable graphical interfaces described herein, as well as perform and provide analytics and other operations. In some implementations, the enterprise application 126 may perform additional operations and communications based on the information received from client devices 106, as described elsewhere herein.

The database 128 may be stored on one or more information sources for storing and providing access to data, such as the data storage device 208. The database 128 may store data describing client devices 106, instances of the property evaluation application 108, customers, items, inventories, preferences, etc. For instance, the database 128 may store user data, property data, custom home attributes, priorities, rankings, notes, images, or other data, such as are described herein.

A third-party server 118 can host services such as a third-party application (not shown), which may be individual and/or incorporated into the services provided by the application server 122. For example, the third-party server 118 may represent one or more MLS servers, education data providers, showing scheduling servers, or other servers (e.g., of Pinterest™, Zillow™, Houzz™, e-mail, etc.).

It should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 2:
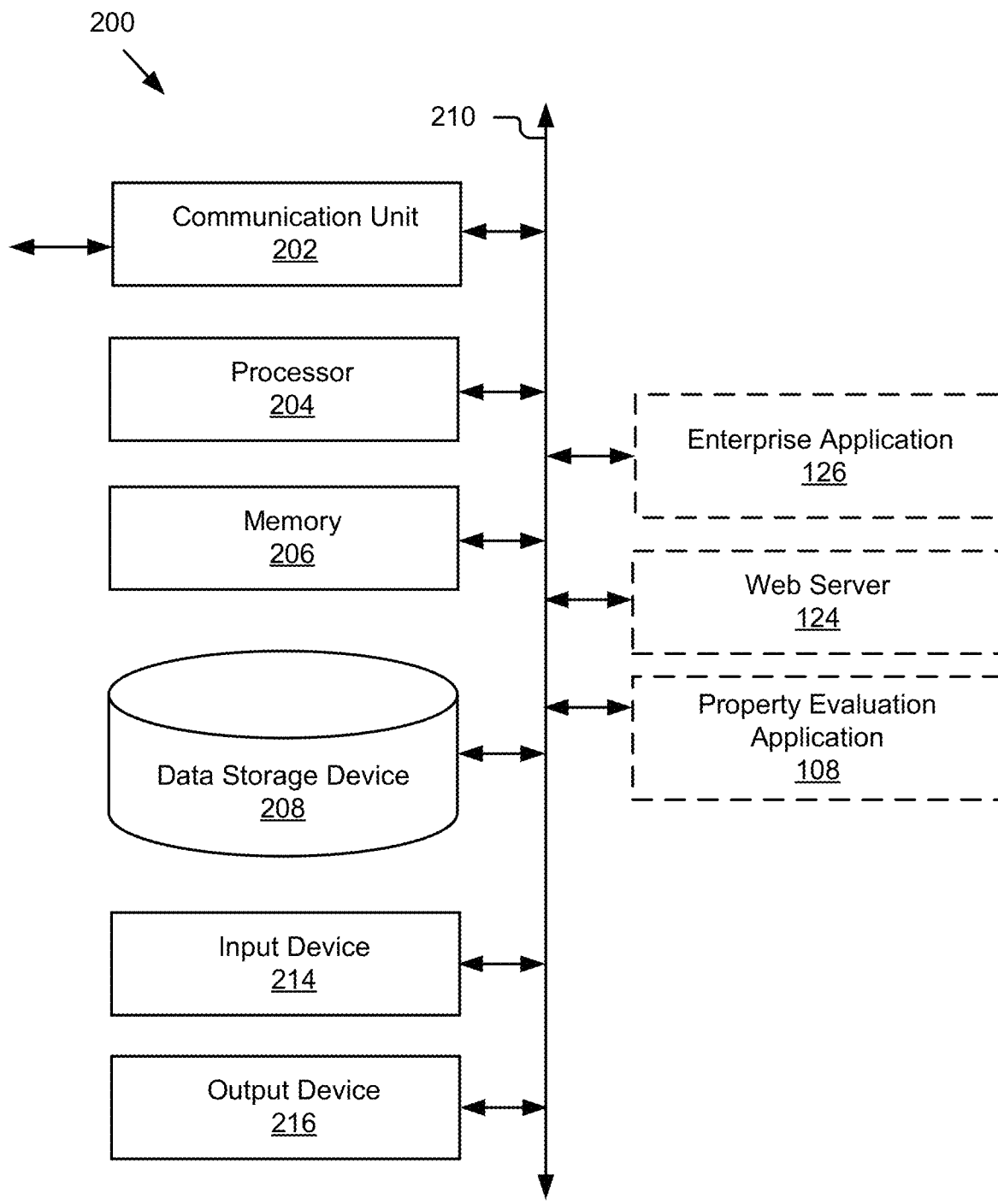
FIG. 2 is a block diagram of an example computing system.

FIG. 2 is a block diagram of an example computing system 200, which may represent the computer architecture of a client device 106, third-party server 118, application server 122, and/or another device described herein, depending on the implementation. In some implementations, as depicted in FIG. 2, the computing system 200 may include an enterprise application 126, a web server 124, a property evaluation application 108, or another application, depending on the configuration. For instance, a client device 106 may include a property evaluation application 108 (which could incorporate various aspects of the enterprise application 126, in some implementations); and the application server 122 may include the web server 124, the enterprise application 126, and/or components thereof, although other configurations are also possible and contemplated.

The enterprise application 126 includes computer logic executable by the processor 204 to perform operations discussed elsewhere herein. The enterprise application 126 may be coupled to the data storage device 208 to store, retrieve, and/or manipulate data stored therein and may be coupled to the web server 124, the property evaluation application 108, and/or other components of the system 100 to exchange information therewith.

The web server 124 includes computer logic executable by the processor 204 to process content requests (e.g., to or from a client device 106). The web server 124 may include an HTTP server, a REST (representational state transfer) service, or other suitable server type. The web server 124 may receive content requests (e.g., product search requests, HTTP requests) from client devices 106, cooperate with the enterprise application 126 to determine the content, retrieve and incorporate data from the data storage device 208, format the content, and provide the content to the client devices 106.

In some instances, the web server 124 may format the content using a web language and provide the content to a corresponding property evaluation application 108 for processing and/or rendering to the user for display. The web server 124 may be coupled to the data storage device 208 to store retrieve, and/or manipulate data stored therein and may be coupled to the enterprise application 126 to facilitate its operations.

The property evaluation application 108 includes computer logic executable by the processor 204 on a client device 106 to provide for user interaction, receive user input, present information to the user via a display, and send data to and receive data from the other entities of the system 100 via the network 102. In some implementations, the property evaluation application 108 may generate and present user interfaces based on information received from the enterprise application 126 and/or the web server 124 via the network 102. For example, a customer/user may use the property evaluation application 108 to perform the operations described herein.

In some implementations, the property evaluation application helps a user to select, refine, update, and customize personal budget and preferences to use in past and future evaluations. The property evaluation application may automatically recalculate past ratings based on updated criteria, allow a user to share information with other users, and/or allow multiple users to link/join their accounts and combine criteria together into one list. For instance, items may contain tags showing which user the item stemmed from, or if it came from multiple users. In some implementations, the property evaluation application allows users to search for potential property options through third party providers, incorporate users' personal criteria as the structure for evaluation and note-taking purposes, calculate an automated score based on weighted criteria and user reactions to notes, pictures, etc., and/or store user evaluations, notes, potential purchase nicknames and details in online repository and syncs data to other linked users as requested.

In some implementations, the property evaluation application may allow users to compare previous evaluations and notes, allow users to see each other's profiles and communicate with each other, including sending messages, upcoming and past evaluations, etc., allow users to invite client users to join accounts and connect accounts, and/or predict a user's satisfaction with potential properties they may visit.

As depicted, the computing system 200 may include a processor 204, a memory 206, a communication unit 202, an output device 216, an input device 214, and a data storage device 208, which may be communicatively coupled by a communication bus 210. The computing system 200 depicted in FIG. 2 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 200 may include various operating systems, sensors, additional processors, and other physical configurations. The processor 204, memory 206, communication unit 202, etc., are representative of one or more of these components.

The processor 204 may execute software instructions by performing various input, logical, and/or mathematical operations. The processor 204 may have various computing architectures to method data signals (e.g., CISC, RISC, etc.). The processor 204 may be physical and/or virtual, and may include a single core or plurality of processing units and/or cores. In some implementations, the processor 204 may be coupled to the memory 206 via the bus 210 to access data and instructions therefrom and store data therein. The bus 210 may couple the processor 204 to the other components of the computing system 200 including, for example, the memory 206, the communication unit 202, the input device 214, the output device 216, and the data storage device 208.

The memory 206 may store and provide access to data to the other components of the computing system 200. The memory 206 may be included in a single computing device or a plurality of computing devices. In some implementations, the memory 206 may store instructions and/or data that may be executed by the processor 204. For example, the memory 206 may store one or more of the enterprise application 126, the web server 124, the property evaluation application 108, and their respective components, depending on the configuration. The memory 206 is also capable of storing other instructions and data, including, for example, an operating system, hardware drivers, other software applications, databases, etc. The memory 206 may be coupled to the bus 210 for communication with the processor 204 and the other components of computing system 200.

The memory 206 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 204. In some implementations, the memory 206 may include one or more of volatile memory and non-volatile memory (e.g., RAM, ROM, hard disk, optical disk, etc.). It should be understood that the memory 206 may be a single device or may include multiple types of devices and configurations.

The bus 210 can include a communication bus for transferring data between components of a computing device or between computing devices, a network bus system including the network 102 or portions thereof, a processor mesh, a combination thereof, etc. In some implementations, the enterprise application 126, web server 124, property evaluation application 108, and various other components operating on the computing system/device 100 (operating systems, device drivers, etc.) may cooperate and communicate via a communication mechanism included in or implemented in association with the bus 210. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 202 may include one or more interface devices (I/F) for wired and wireless connectivity among the components of the system 100. For instance, the communication unit 202 may include, but is not limited to, various types known connectivity and interface options. The communication unit 202 may be coupled to the other components of the computing system 200 via the bus 210. The communication unit 202 can provide other connections to the network 102 and to other entities of the system 100 using various standard communication protocols.

The input device 214 may include any device for inputting information into the computing system 200. In some implementations, the input device 214 may include one or more peripheral devices. For example, the input device 214 may include a keyboard, a pointing device, microphone, an image/video capture device (e.g., camera), a touch-screen display integrated with the output device 216, etc. The output device 216 may be any device capable of outputting information from the computing system 200. The output device 216 may include one or more of a display (LCD, OLED, etc.), a printer, a haptic device, audio reproduction device, touch-screen display, a remote computing device, etc. In some implementations, the output device is a display which may display electronic images and data output by a processor of the computing system 200 for presentation to a user, such as the processor 204 or another dedicated processor.

The data storage device 208 may include one or more information sources for storing and providing access to data. In some implementations, the data storage device 208 may store data associated with a database management system (DBMS) operable on the computing system 200. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The data stored by the data storage device 208 may be organized and queried using various criteria including any type of data stored by them, such as described herein. For example, the data storage device 208 may store the database 128. The data storage device 208 may include data tables, databases, or other organized collections of data. Examples of the types of data stored by the data storage device 208 may include, but are not limited to the data described with respect to the figures, for example.

The data storage device 208 may be included in the computing system 200 or in another computing system and/or storage system distinct from but coupled to or accessible by the computing system 200. The data storage device 208 can include one or more non-transitory computer-readable mediums for storing the data. In some implementations, the data storage device 208 may be incorporated with the memory 206 or may be distinct therefrom.

The components of the computing system 200 may be communicatively coupled by the bus 210 and/or the processor 204 to one another and/or the other components of the computing system 200. In some implementations, the components may include computer logic (e.g., software logic, hardware logic, etc.) executable by the processor 204 to provide their acts and/or functionality. In any of the foregoing implementations, the components may be adapted for cooperation and communication with the processor 204 and the other components of the computing system 200.

FIG. 3A is a flowchart of an example method 300 for providing a data aggregation and evaluation tool. The example method 300 may include gathering buyer preferences or purchase criteria and establishing criteria priority, for instance, the property evaluation application 108 may allow the user to establish their own criteria, rate the criteria, use the criteria as a checklist during a walkthrough of a home, and then objectively analyze the home based on the criteria and weightings.

At 302, the property evaluation application 108 may receive preferences for property attributes from a user. In some implementations, the property evaluation application 108 may receive a first input from a user indicating a preference for a set of attributes. For instance, the property evaluation application 108 may offer a list of home attributes (e.g., square footage, garage capacity, location attributes, bathroom quantity, curb appeal, etc.) from pre-generated list of primary, secondary, and/or tertiary features. The user may select from among the presented attributes the attributes desired in a home to identify those that are important to the user. In some instances, the user may also add custom attributes (e.g., house has a swing set). Attributes presented to the user, but not selected by the user may automatically be scored zero, removed from consideration, and/or remain unsorted, as described below.

In some implementations, hard requirements may be established (e.g., number of bedrooms, price range, etc.) in addition to other preferences of a user. Additionally, selected attributes may be divided into categories (and flagged based on the category), such as kitchen (e.g., pantry size, countertop type, stove top, flooring, etc.), layout (floorplan type, open layout, mother-in-law suite, etc.), amenities (solar, pool, central air, etc.), etc.

In some implementations, the property evaluation application 108 may receive a custom attribute in a certain category (or a custom or "other" category) from the user. For instance, a user may request an attribute that is not pre-defined, such as a 4-car wide driveway, lap pool, or other uncommon attribute. In such instances, as described below, the user may also define an attribute value of the custom attribute so that it may be used when scoring properties along with other attributes, as described below.

Figure 5A:
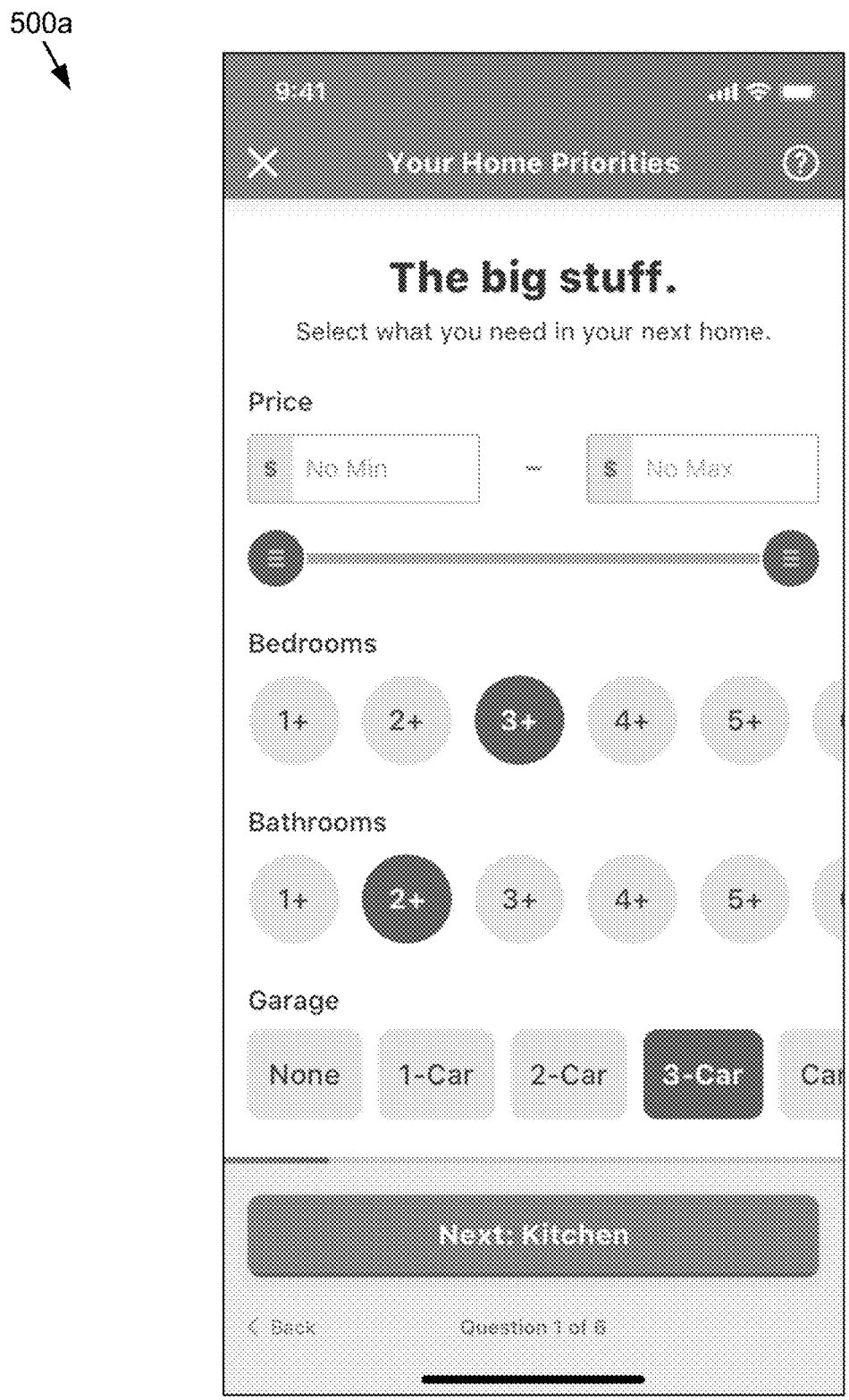
FIGS. 5A-5D illustrate example graphical user interfaces presented by the property evaluation application for receiving preferences for property attributes.
Figure 5B:
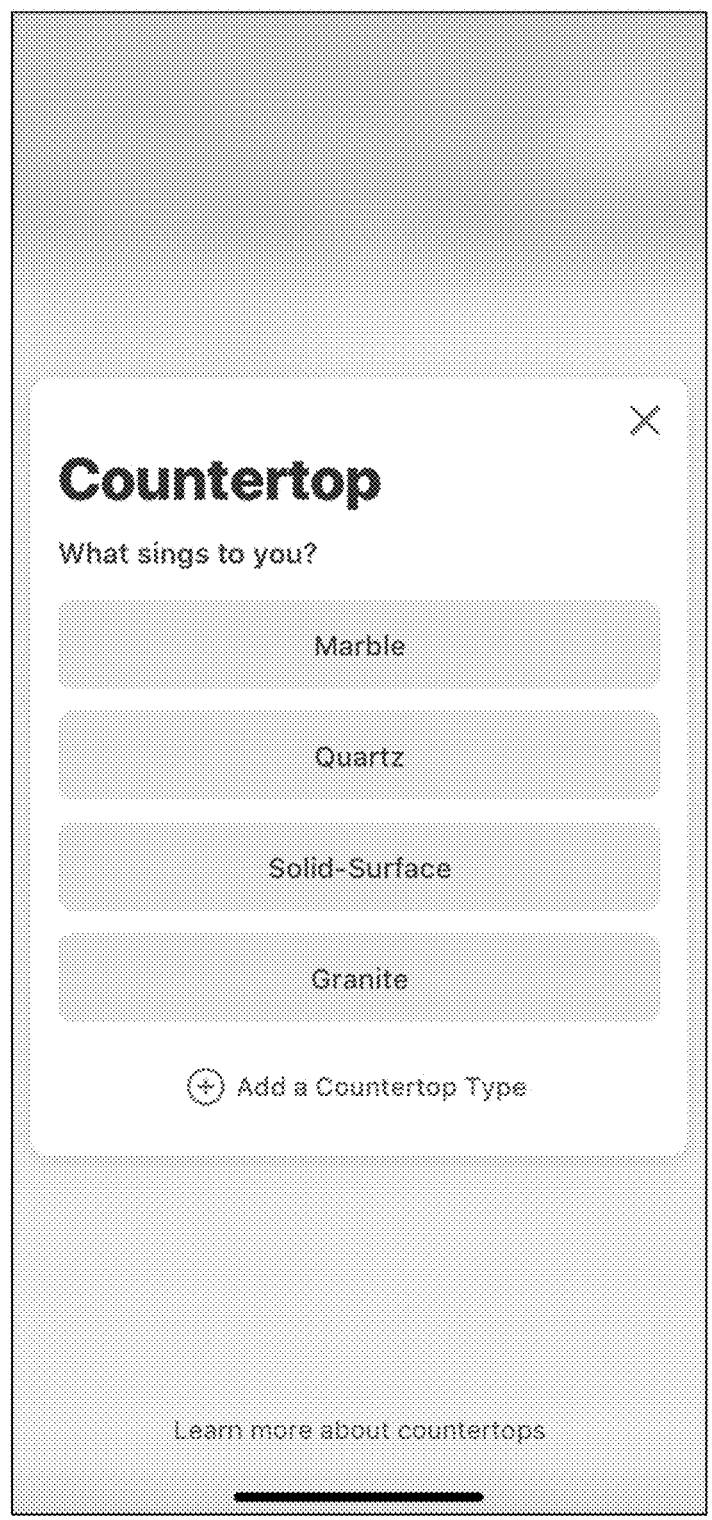
Figure 5C:
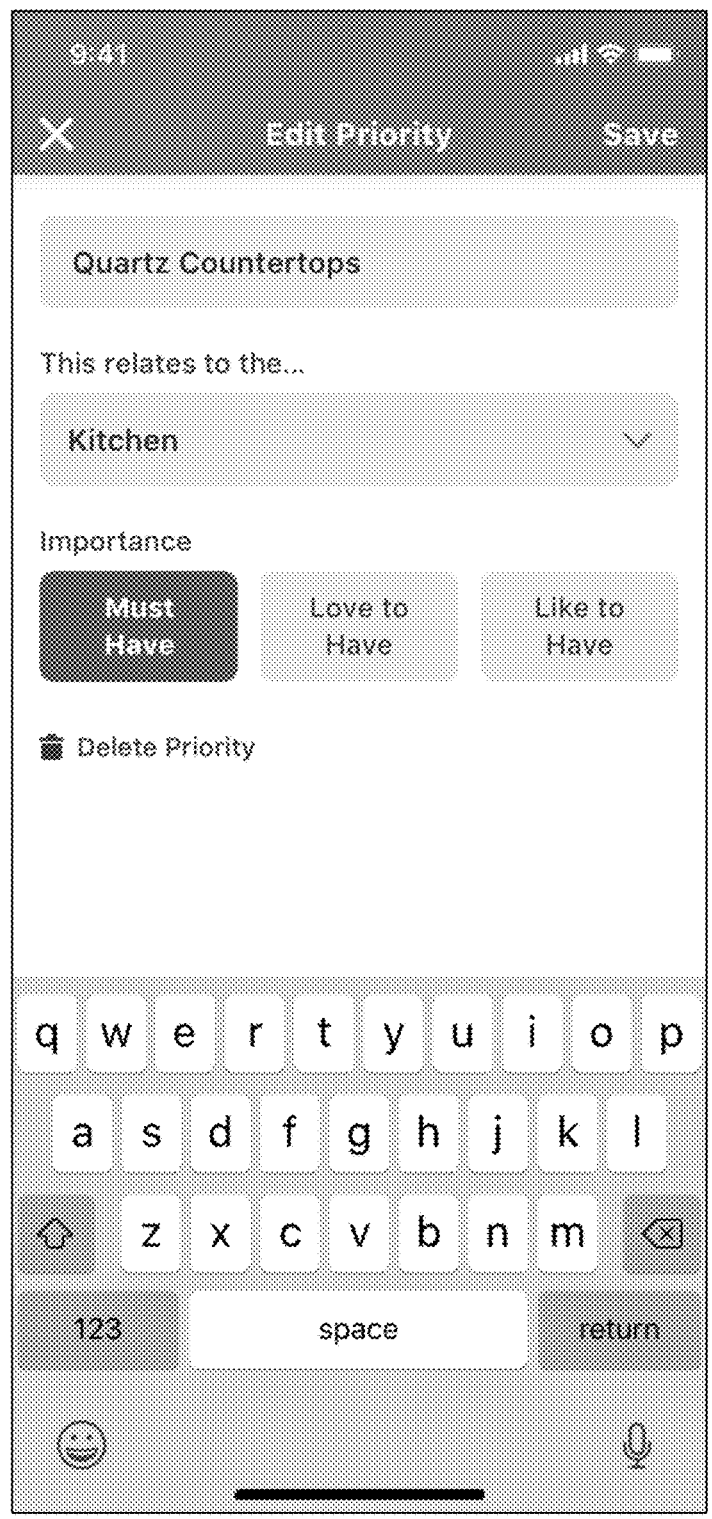
Figure 5D:
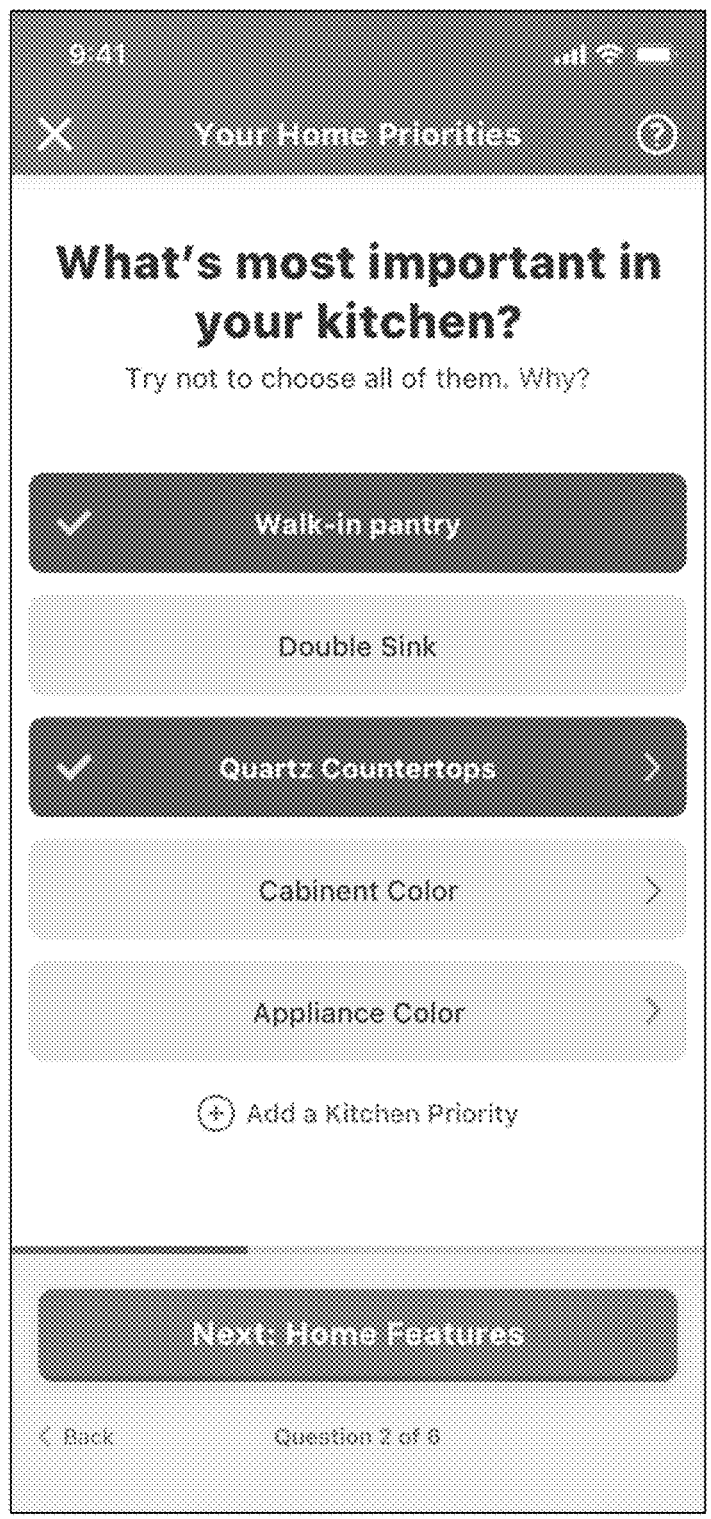

FIGS. 5A, 5B, 5C, and 5D illustrate example graphical user interfaces presented by the property evaluation application 108 for receiving preferences for property attributes from a user. For example, FIG. 5A illustrates an example interface 500a for receiving preferences for certain attributes (e.g., bedrooms, bathrooms, etc.) for a given category (e.g., a kitchen); FIG. 5B illustrates an example interface 500b for receiving a preference for an attribute of a certain feature (e.g., a type of countertop); FIG. 5C illustrates an example interface 500c for manually defining a priority or importance of a certain attribute (e.g., when determining attributes or modifying weights); and FIG. 5D illustrates an example interface 500d for selecting preferred attributes from among a set of available attributes. It should be noted that these or other interfaces may be used additionally or alternatively without departing from the scope of this disclosure.

In some implementations, at 304, the property evaluation application 108 may generate a set of queries using the property attribute preferences from the group of home attribute preferences received from and/or selected by the user. The property evaluation application 108 may generate a set of queries associated with the set of attributes based on the received preference(s) for the set of attributes.

In some implementations, the property evaluation application 108 may select a plurality of pairs of preferred attributes from the set of attributes (e.g., randomly, based on projected importance, order added, as described below, etc.). For example, the property evaluation application 108 may select a first attribute and a second attribute from the set of attributes for comparison in a query.

Beneficially, while typical searching defines required features (e.g., using inflexible Boolean logic), these operations may allow the property evaluation application 108 to flexibly find properties with attributes preferentially searched for based on relative priority.

Figure 6:
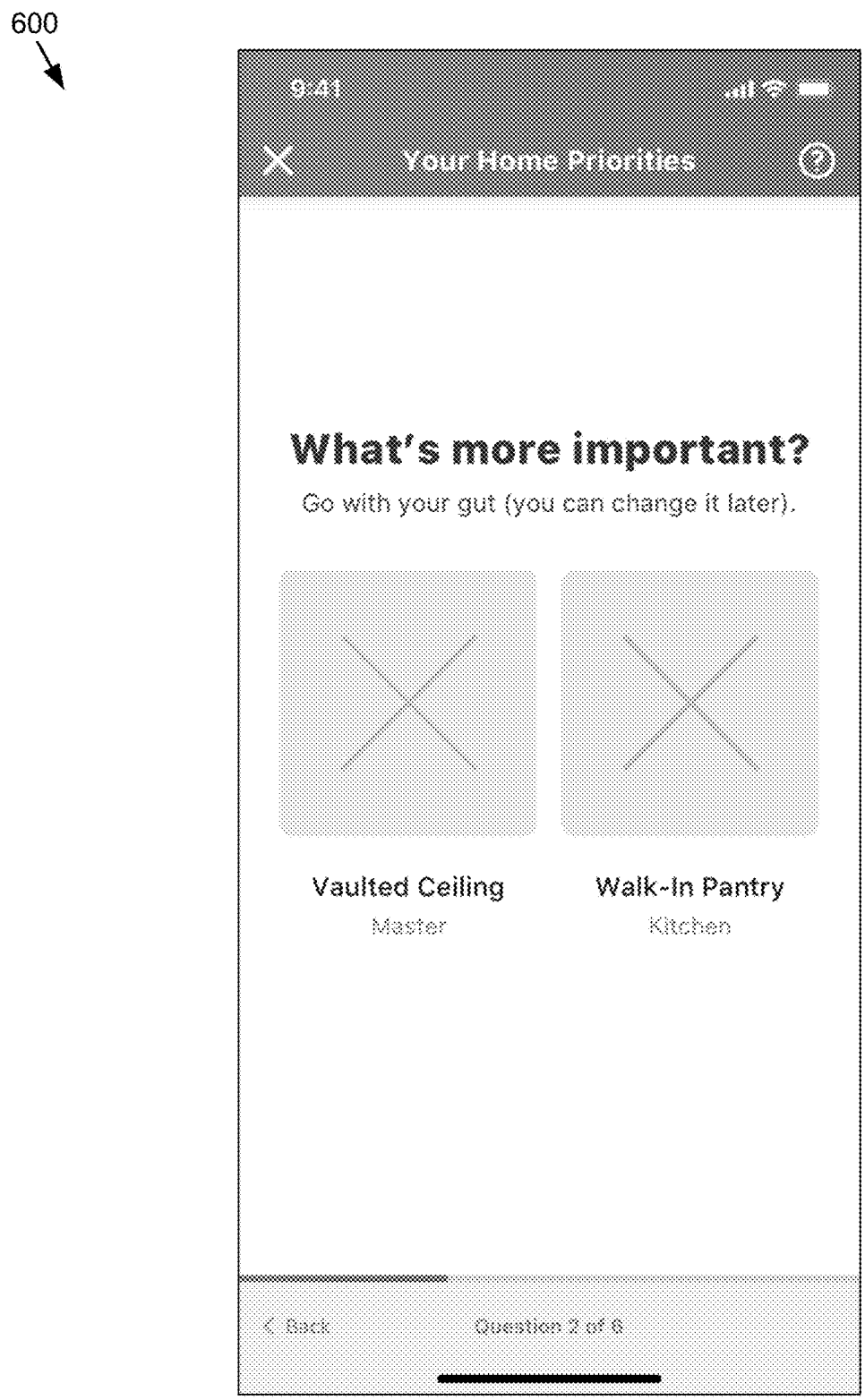
FIG. 6 illustrates an example interface for responding to a query.

For instance, depending on the implementation, the property evaluation application 108 may determine a series of binary questions comparing individual attributes. Example generated graphical elements for receiving preferences are illustrated in FIG. 6, which shows an example interface 600 for responding to a series of binary queries.

In some implementations, although many preferred attributes may be entered, the property evaluation application 108 may select a defined quantity of the pairs, for example, so that fewer than a threshold number of queries are provided to the user. For instance, the property evaluation application 108 may reduce the set of questions asked, so that not every single attribute is rated. For example, the property evaluation application 108 may determine 10 questions out of a total number (e.g., 50 for a larger set of attributes) of potential questions that compare individual attributes together. Out of the potential questions and/or attributes, the property evaluation application 108 may select a reduced quantity at random or based on some other criteria. For example, the property evaluation application 108 may track (e.g., statistically, using computer learning, etc.) selected and/or highly ranked attributes across a group of users and present questions pertaining to these attributes.

In some implementations, the property evaluation application 108 may use binary questions where a first attribute is compared to a second attribute and the property evaluation application 108 asks the user for input selecting which of the two is more important. Binary questions are particularly useful as it is generally easy for humans to compare two options but difficult to rank an entire list of options. For example, the property evaluation application 108 may randomly select two of the attributes selected by the user and generate a query asking the user to compare the attributes. It should be noted that more complex queries (e.g., prioritizing a set of 3 or more attributes, assigning a numbered score/weight, etc.) may be used.

In some implementations, the property evaluation application 108 may reduce the quantity of queries asked the user, for example, instead of comparing every single preferred attribute to every single other preferred attribute, which would require many queries. For example, the property evaluation application 108 may use a logical decision tree and/or a computer-sorting algorithm, such as tournament sort, selection sort, heapsort, or another algorithm to determine a ranking, order of queries asked, and reduce the overall quantity of queries generated and/or asked.

For instance, as described in further detail below, the property evaluation application 108 have 5 preferred attributes for which to determine queries. Instead of comparing every attribute together (e.g., "Which of these 2 attributes is more preferred?"), the property evaluation application 108 may compare a next attribute to an attribute for which a rank is known. If more than 2 attributes are already ranked, a next unsorted attribute may be compared to the middle attribute in the known ranking and then the next middle attribute in the ranking.

For example, if the user selects 5 preferred attributes (A, B, C, D, and E), two randomly selected attributes may be compared (e.g., a query is generated asking the user to select one of the two attributes). For example, the property evaluation application 108 may generate a query comparing A and D, the user indicates that A is preferred, so the property evaluation application 108 ranks the sorted attributes as A-D. The property evaluation application 108 may then randomly select to compare B against A (the higher or lower of the two attributes, depending on the implementation), generate a query asking for a preference between A and B, and receive the user's answer. If the user prefers B to A, the sorted attributes may be ranked B-A-D. If the user prefers A to B, the property evaluation application 108 may generate another query comparing B to D. If the user prefers B to D then the ranking would be A-B-D, but if the user prefers D to B the ranking would be A-D-B.

The property evaluation application 108 may then randomly select to compare C, which it would compare to the middle-ranked attribute (D in the last example A-D-B). If the user prefers C to D, then the property evaluation application 108 would compare C to A. If the user prefers C to A, then the resulting ranked list would be C-A-D-B. The property evaluation application 108 would then compare the last attribute (E) to the middle-ranked attribute (A or D) and then proceed with remaining queries selecting the middle attribute of the ranked attributes until all are ranked or until a defined quantity of queries has been asked (e.g., leaving the remaining attributes unsorted or in their last sorted position).

As a more comprehensive example, if the property evaluation application 108 has ranked 9 attributes as A-B-C-D-E-F-G-H-I, and a remaining attribute X was to be ranked, the property evaluation application 108 would first generate a query comparing X to E, then (if X is preferred to E) X to B (or D, randomly or based on an administratively defined setting), then (if X is preferred to B) X to A. Finally, if A is preferred to X, the overall ranking would be A-X-B-C-D-E-F-G-H-I. Although other implementations are possible and contemplate herein, additional examples are provided below.

In some instances, the property evaluation application 108 may perform the sorting operation by cutting potential possibilities in half with each comparison. For example, the property evaluation application 108 may first compare the current priority with whatever priority is in the middle of the current string of preferred attributes. (so prioritizing 'h' with the 'abcdefg' string would compare 'h' and 'd'). After the compare property evaluation application 108 knows the remaining possibilities are in the second half of the string, so it will be somewhere in the 'efg' range. It compares 'h' with the middle of that string, so it compares 'h' and 'f'. After the compare property evaluation application 108 then knows the remaining possibilities are in the second half of that string (and it is less important than 'f'), so it will either be before or after 'g'. It compares 'h' and 'g'.

The example may jump between various portions when there are instances where there is no "middle of the string". For example, continuing the last example—'abcdefgh', the process may be performed as follows: 1. To compare 'i' with that string, it may compare to either 'd' or 'e'. The convention of taking the first middle priority encountered, as applicable, may be used. In this example, the property evaluation application 108 may compare 'i' and 'd'. 2. After the comparison, the property evaluation application 108 knows the remaining possibilities are in the second half of the string, so it will be somewhere in the 'efgh' range. It compares 'i' with the middle of that string—however when there is no middle of the string, the process may follow the previous convention and compare 'i' and 'f'. 3. After the comparison, property evaluation application 108 knows the remaining possibilities are in the second half of the string, so it will be somewhere in the 'gh' range. The property evaluation application 108 may compare 'i' with the middle of that string—however, since there is no middle, it follows the previous convention and compares 'i' and 'g'. 4. After the comparison, the property evaluation application 108 then knows the remaining possibilities are in the second half of that string, so it will either be before or after 'h'. It compares 'i' and 'h'.

It should be noted that either the first half of the middle or the second half of the string (or set of attributes) may be selected as the convention, although other implementations are also possible. For instance, the second half of the middle may be exchanged for first half of the middle first, although these are design choices that may be modified in different implementations.

Although other implementations for generating queries are possible, a more thorough example is provided below, which is based on the following string: adcgeihfbj, where each letter represents an attribute/priority.

1. compare a and d (ad). 2. compare c and d. 3. compare c and a (acd). 4. compare g and c. 5. compare g and d (acdg). 6. compare e and d. 7. compare e and g (acdeg). 8. compare i and d. 9. compare i and e. 10. compare i and g (acdegi). 11. compare h and e. 12. compare h and g [note that this is jumping 50% to the end]. 13. compare h and i (acdeghi). 14. compare f and e. 15. compare f and h [jumping 50% to the end]. 16. compare f and g (acdefghi). 17. compare b and f. 18. compare b and d [jumping 50% to the beginning]. 19. compare b and c. 20. compare b and a (abcdefghi). 21. compare j and e. 22. compare j and g [jumping 50% to the end]. 23. compare j and h. 24. compare j and i (abcdefghij). Note that the jumps on #12, #15, #18, and #22 may effectively split the remaining possible results in half, which may reduce the questions that are asked.

At 306, the property evaluation application 108 may determine weights associated with the property attributes using user input to the set of queries. In some implementations, the property evaluation application 108 may provide the set of queries associated with the set of attributes for display via the graphical user interface and may receive an input to one or more of the set of queries. Once the input is received, the property evaluation application 108 may determine a set of weights associated with the set of attributes based on the second input and the set of queries.

In some implementations, the property evaluation application 108 may sort the set of attributes into attribute groupings (each of which groupings has a weight or number of points, as described below) based on user responses to the set of queries and/or may sort the attributes into a ranking as described below.

In some implementations, the property evaluation application 108 may prioritize preferences for the attributes based on the series of generated queries and the user's interaction with a graphical user interface on which the queries are presented. For instance, the property evaluation application 108 may present the subset of potential comparisons between attributes to the user and receive user input for each comparison/query. The property evaluation application 108 may present two attributes at a time to a user for the user's selection until all attributes are ranked, or until the user reaches a maximum number of comparison opportunities. In some implementations, the user may be able to exit the evaluation early ("e.g., go to results") by responding to a subset of the queries or, in some instances, the user may select to evaluate more (e.g., "sort 10 more") of the attributes.

As described elsewhere herein, the attributes that are presented may be based on a selection algorithm, which may include an element of randomness, and sorted according to user responses. For example, the user may select which of the attributes is more important and, based on the user input, the property evaluation application 108 may order the attributes from most important to least important (as well as potentially equally important, for instance, if unsorted).

In some implementations, the priorities may be separated into groups based on importance, for example, based on the ranking, which may be displayed to the user in the graphical user interface. For example, of an example 10 ranked attributes, the property evaluation application 108 may select the top 3 as "must have" attributes, the middle 4 as "love to have" attributes, and the bottom 3 as "like to have" attributes. The property evaluation application 108 may leave any selected (e.g., at 302) unsorted attributes (e.g., because they were not part of any answered queries) in a fourth, unsorted/unranked category. In some instances, the property evaluation application 108 may receive user input (e.g., dragging a graphical element across the graphical user interface, "press and hold" to drag items, etc.) to manually change the categorization of ranked or unranked attributes. For instance, the user may move 3 unsorted attributes into the "must have" section (e.g., for a total of 7 must have attributes), and move 2 of the "love to have" attributes into the "like to have" section (for a total of 2 and 5 attributes, respectively).

In some implementations, the property evaluation application 108 may then weight each attribute based on one or more of its position/ranking in the order and/or based on the section/category in which it is displayed. For instance, three groups may be displayed indicating "high, medium, low" priority, alternatively described as deal breaker, important, nice to have, or some other similarly descriptive means, such as must have, love to have, like to have, unsorted, unselected, etc. Although other weights are possible, the property evaluation application 108 may weight those attributes in the "must have" section at 4 points each, "love to have" at 2 points, and "like to have" at 1 point. In some instances, these weights may be different and are selected as a design choice, for example, unsorted but selected attributes may also be assigned weights, the sections may have different values/weights, there may be more sections, etc. In some instances, additional nuances to the initial weighting may also be possible, for example, based on a position/ranking within each section.

Returning to FIG. 3A, in some implementations, at 308, the property evaluation application 108 may determine attribute values of the set of attributes for the one or more properties. The property evaluation application 108 may receive data describing one or more attribute values of the set of attributes for one or more properties as described below and in reference to FIG. 3C. For instance, if an attribute is "has two kitchens" the attribute value might be "true."

In some implementations, the property evaluation application 108 may gather information pertaining to a unique property (e.g., a specific house) and the attributes of the property, for example, using the attributes selected or entered by the user above.

In some implementations, the property evaluation application 108 may automatically retrieve data pertaining to a particular property, such as a real-estate listing, from an MLS server or other third-party service, such as ListHub™. The property evaluation application 108 may then use the attributes listed in the listing (e.g., a quantity in a square footage data field, a quantity in a bedrooms field, a keyword in a description, etc.) to pre-score the property, for instance, by applying the assigned points/weight of present attributes to the score, as described below.

In some implementations, at 310, the property evaluation application 108 may generate a property-rating score (also referred to herein as a property score or total score) describing a unique property (e.g., a specific house, object, etc.) based on gathered information, such as the weights and attribute values. The property evaluation application 108 may score a first property using the set of weights and an attribute value specific to the first property. In some implementations, the property evaluation application 108 may score the first property using the weights and attribute values including combining the weight and the attribute value of a certain attribute to generate an attribute score. For instance, a total property-rating score may be determined for the first property including attribute scores for each attribute of the property.

For example, the property evaluation application 108 may add up the weights, normalize them, or use another calculation to determine a numerical score for the property based on the user's feedback pertaining to those certain criteria/attributes selected, along with their weights. The score may be used and/or presented, as described below.

In some implementations, the property evaluation application 108 may be adapted to execute on a device to assign a numerical value ("score") to a toured home, based on the presence of each of the selected attributes identified as being present in the property. For instance, the property toured may be assigned a score based on combined values of the present attributes, the attribute priority category (such as High, Medium, Low, etc.), and order in that category (such as second in the list).

For instance, 4 points may be assigned for high, 2 points for medium, and 1 point for low priority items that are present for a particular property (e.g., a priority/attribute indicates 4+ bedrooms, a house has 4+ bedrooms, and the application correspondingly applies 4 points for this attribute to the score of the property). Similarly, as mentioned above, a user can provide positive, neutral, or negative comments in addition to or in place of indicating the presence/absence of an attribute (e.g., as described in further detail in reference to FIG. 3C). For example, positive comments may contribute +1 point each, negative comments contribute −1 point each, but they don't increase the total possible score of the house. Because of that, there are instances where comments could make the score of a house go above a property score of 10 or below 0, although the score may be normalized. In some implementations, the property evaluation application 108 may compute the score based on the total points acquired for the properties (based on weights, evaluations, etc.) divided by the total possible points (e.g., total house points/total possible house points). In some instances, the score may be scaled, presented as a percentage, normalized, etc. The weighted percentile may be displayed to illustrate how much more important "must have" priorities are than other priorities/attributes.

Figure 3B:
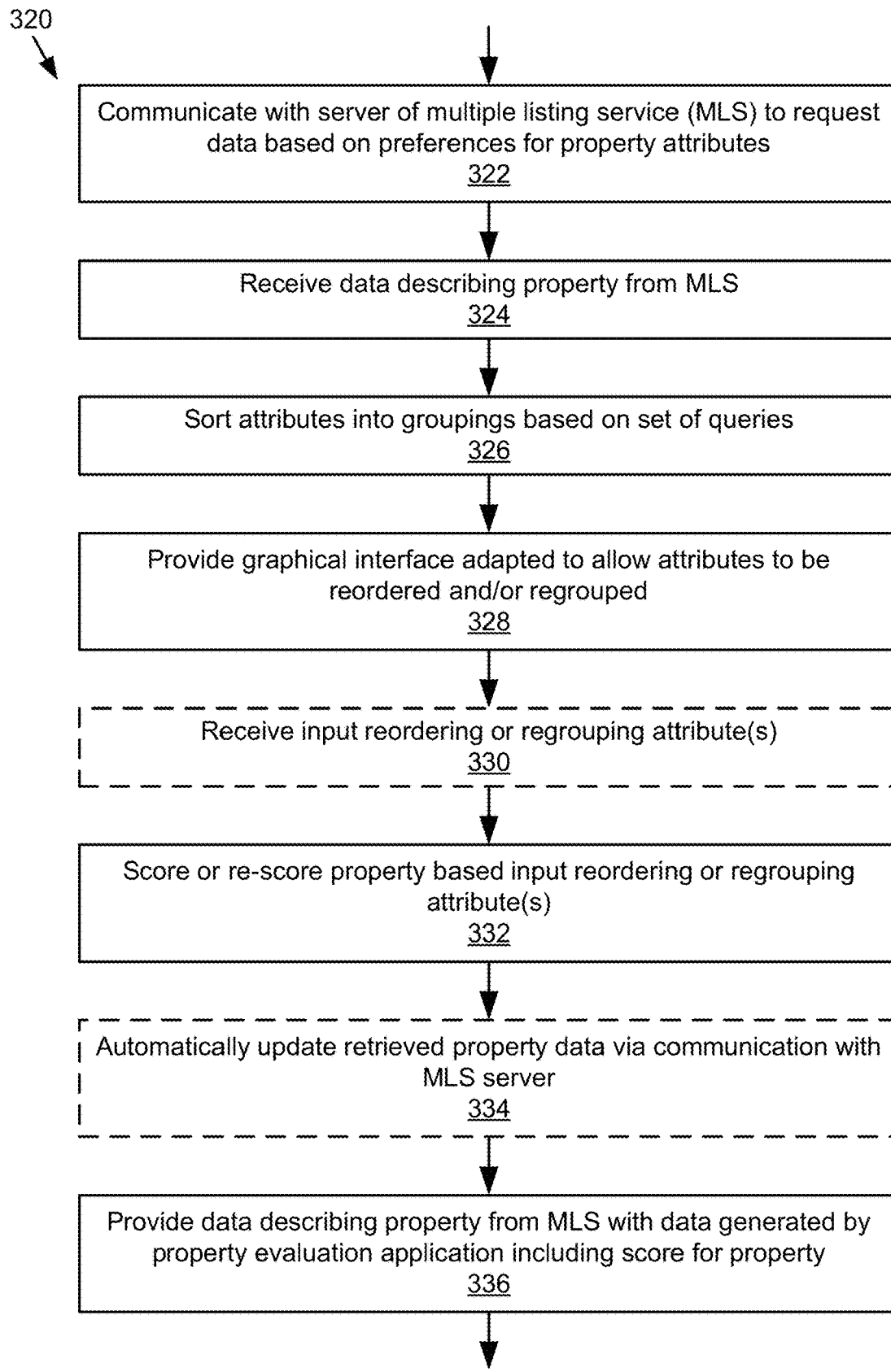
FIG. 3B illustrates an example method for determining weights associated with property attributes using user inputs and the set of queries.
Figure 3C:
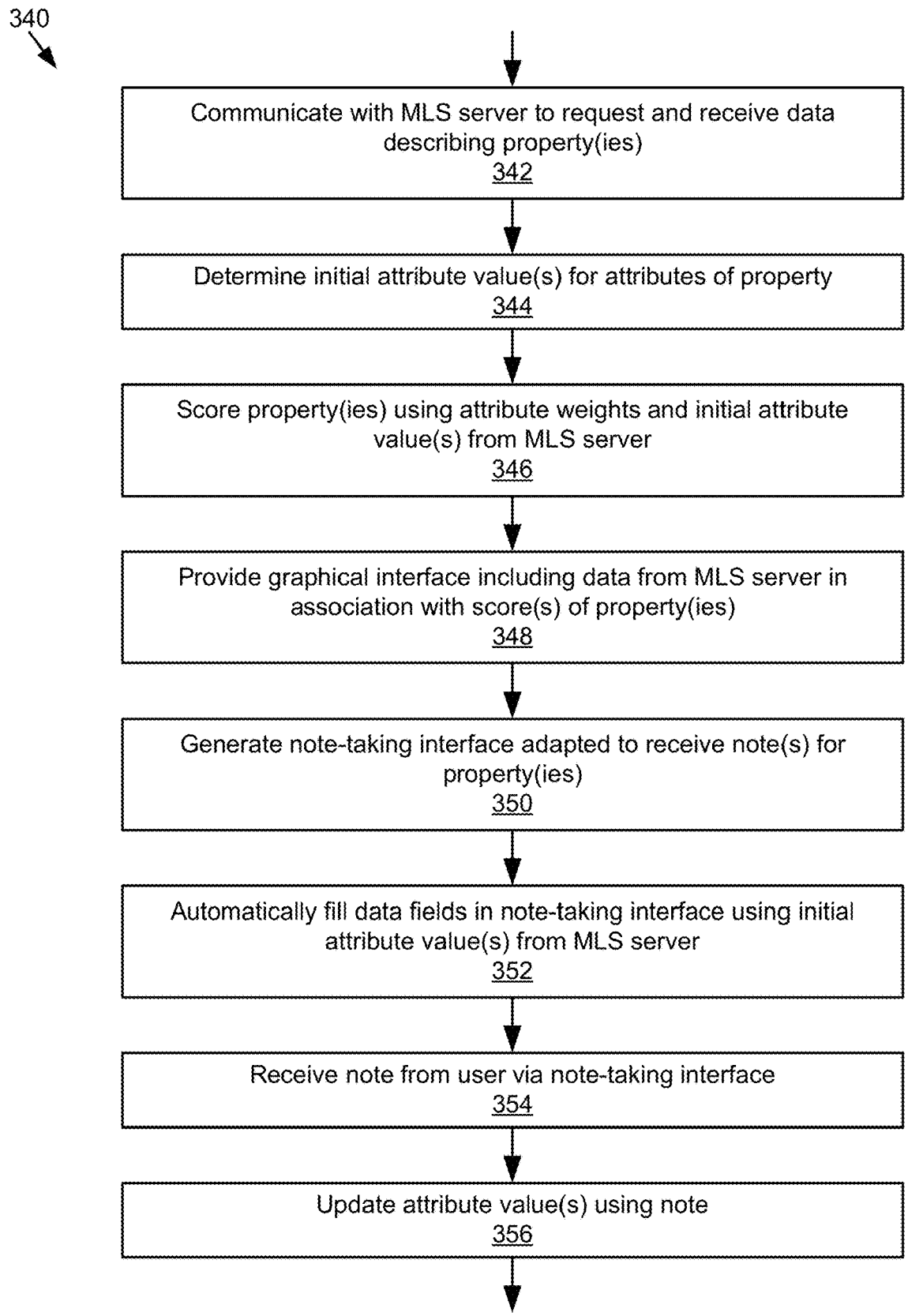
FIG. 3C illustrates an example method for receiving data describing attribute values of the set of attributes for properties.

In some implementations, as described in reference to FIG. 3C, the property score may be modified by the user, for example, at the end of a property evaluation, by applying additional points or weights to the score. For example, the property evaluation application 108 may receive user input adjusting the score (e.g., based on a positive overall impression), etc. In some instances, the score adjustment may be manually entered, although it may be automatically calculated in other instances. For example, the property evaluation application 108 may track the amount of time a user spends looking at or evaluating a house, the quantity of times the user views the house, the number of notes taken about the house, etc., and use the tracked value (e.g., in comparison to the time spent for other houses on the list) to further adjust the score for the user/property.

In some implementations, the user may select a star rating (e.g., 1-5 stars) indicating an overall positive/negative impression of the house. The star rating may add/subtract points, scale the score, etc., the score based on the number of stars. Alternatively, the property evaluation application 108 may rank properties separately based on stars from property score. Additionally or alternatively, properties may be favorited (e.g., by clicking a heart icon). For instance, properties may be ranked first based on being favorited, second based on the stars, and third based on the property score.

Returning to FIG. 3A, in some implementations, at 312, the property evaluation application 108 may synchronize data for the attributes, properties, or evaluations, etc., with one or more other devices, such as another client device 106 (e.g., on which another instance of the property evaluation application 108 is executed), data server (118 or 122), user account, etc. For example, a user account of a buyer who selects attributes and evaluates them may be linked with that of a co-buyer and/or agent that may cooperatively select attributes, evaluate properties for the attributes, etc. In some instances, the co-buyer and/or agent may perform all the same actions as the buyer and their data is synchronized (e.g., using a server, across multiple instances of the property evaluation application 108) to allow them to cooperatively evaluate and view properties. Similarly, an agent (e.g., a user with an authenticated role of agent) may have administrative access for a plurality of buyers and may add properties, attributes, evaluations, adjust scores, etc., for those buyers. In some implementations, the users (e.g., a buyer and agent) may be linked together by sending an e-mail invitation, for example, with activation code. Similarly, in some implementations, invitations may be sent, received, and/or accepted/rejected in an in-app invitation in the property evaluation application 108.

In some implementations, a buyer and co-buyer may separately select different attributes or rank attributes as having separate priorities. The property evaluation application 108 may reconcile the conflicts in a variety of ways, such as by defaulting to the buyer's selection/rankings, duplicating the attributes, or requesting that the buyer or co-buyer select which input should govern the rankings/weights.

The property evaluation application 108 may join a buyer with a co-buyer using some or all of the following constraints: 1. Any priority the buyer puts in their priority list that the co-buyer did not include on their list goes on the joint list. 2. Anything the co-buyer put in their priority list that the buyer did not include on their list goes on the joint list. 3. If the buyer and co-buyer both have the same priority labeled with different importance, the property evaluation application 108 notifies the co-buyer when they decide to link accounts that "When your accounts are linked the application will merge your priority lists together into one combined list, and this process is irreversible. Any priorities you share will initially default to your companion's importance level, but going forward any changes you make will persist. Are you sure you'd like to link accounts?" 4. After they have joined accounts, if a buyer or co-buyer decides to unlink from their buyer or co-buyer, they are able to unlink, so that both people leave with their own copy of the joint list (and can remove anything they do not want from their list going forward).

In some implementations, at 314, the property evaluation application 108 may provide a graphical user interface that presents information comparing properties using the property-rating score(s) and property attribute preference(s). For example, the property evaluation application 108 may alter the graphical user interface to present information pertaining to a property based on the score of the property.

For instance, the property evaluation application 108 may compare homes based on the results of the evaluation. The property evaluation application 108 may present the criteria established at 302-306, the data gathered at 308, and/or the score(s) generated at 310.

In some implementations, the comparison information may be presented as a grid, for example, with each property represented in a column and each selected/entered attribute represented in a row. The property evaluation application 108 may order the properties based on the computed score for each property. In some instances, the order may also be based on properties that have been favorited or starred/upranked by users. For instance, starred properties may be ordered ahead of those with high scores and favorited properties may be ordered above all.

In some instances, a user may highlight/select however many homes desired to compare and the property evaluation application 108 may present a grid comparing home columns with attribute rows based on user criteria, so homes, scores, weights, attributes, etc., can be easily viewed side by side (e.g., as illustrated in FIGS. 9A-9H).

In some implementations, the property evaluation application 108 may determine a screen size of a client device 106 on which the graphical user interface is displayed. The property evaluation application 108 may determine a quantity of the properties having scores satisfying a defined (e.g., based on a quantity of properties that will fit on the screen) threshold and may format the graphical user interface to display graphical elements representing the properties with scores satisfying the threshold, so that the quantity of displayed properties corresponds to the screen size. This adaptability is particularly beneficial as it allows limited screen size devices such as smart phones to efficiently display those properties (e.g., graphical elements and/or information describing properties) that are most important to the user instead of allowing the interface to be cluttered with less-important properties.

Additionally, the property evaluation application 108 may beneficially provide the data describing the first property retrieved from the MLS server in association with data generated by the property evaluation application 108. For instance, the locally generated data such as the score and/or notes may be displayed along side (e.g., with data prepopulated) data retrieved from the MLS server.

In some implementations, in order to reduce bandwidth and memory consumption, the property evaluation application 108 may determine which properties have a score satisfying a defined threshold (e.g., based on a screen size or other factor) and only download data from the MLS server (e.g., the third-party server 118) or application server 122 (e.g., for synced data as described above) for those properties. For instance, this allows those properties that are most relevant to the user's specific needs to be loaded while, in some instances, leaving other data off or for later download.

In some implementations, the property evaluation application 108 may also present educational resources (e.g., curated articles about inspection process, videos about loan approval, a description of seller's disclosures, etc.) to the user at each step of the house selection and evaluation process. For instance, those educational resources presented may be customized based on the progress, the attributes selected, the quantity of houses evaluated, etc. For example, the property evaluation application 108 may present a progress checklist to the user where associated content changes depending on where the user is in the process. For instance, at a particular step, the property evaluation application 108 may retrieve content from an application server 122 or third-party server 118. The content may be uploaded by another computer (e.g., by a device of an agent, loan officer, etc.). In some instances, the content may be specifically associated with a step in the process. In some instances, the content may be associated with a particular buyer, property, or agent, so that the buyer's agent, for example, may upload custom text, images, videos, etc., for the buyer (or the buyers associated with that agent) to see. Accordingly, the property evaluation application 108 may associate specific accounts and steps with specific content.

For example, a user with a role of agent on a first instance of the property evaluation application 108 may upload a video or other data describing an attribute or step in the process and associate it with a particular buyer. The property evaluation application 108 may synchronize the data with the application server 122 and/or another instance of the property evaluation application 108 associated with the particular buyer. The instance of the property evaluation application 108 on which the particular buyer is signed in may download and/or access the video or other data based on authorization associated with the buyer's user profile and/or an association of the video with a particular property, progress step, etc.

Figure 11:
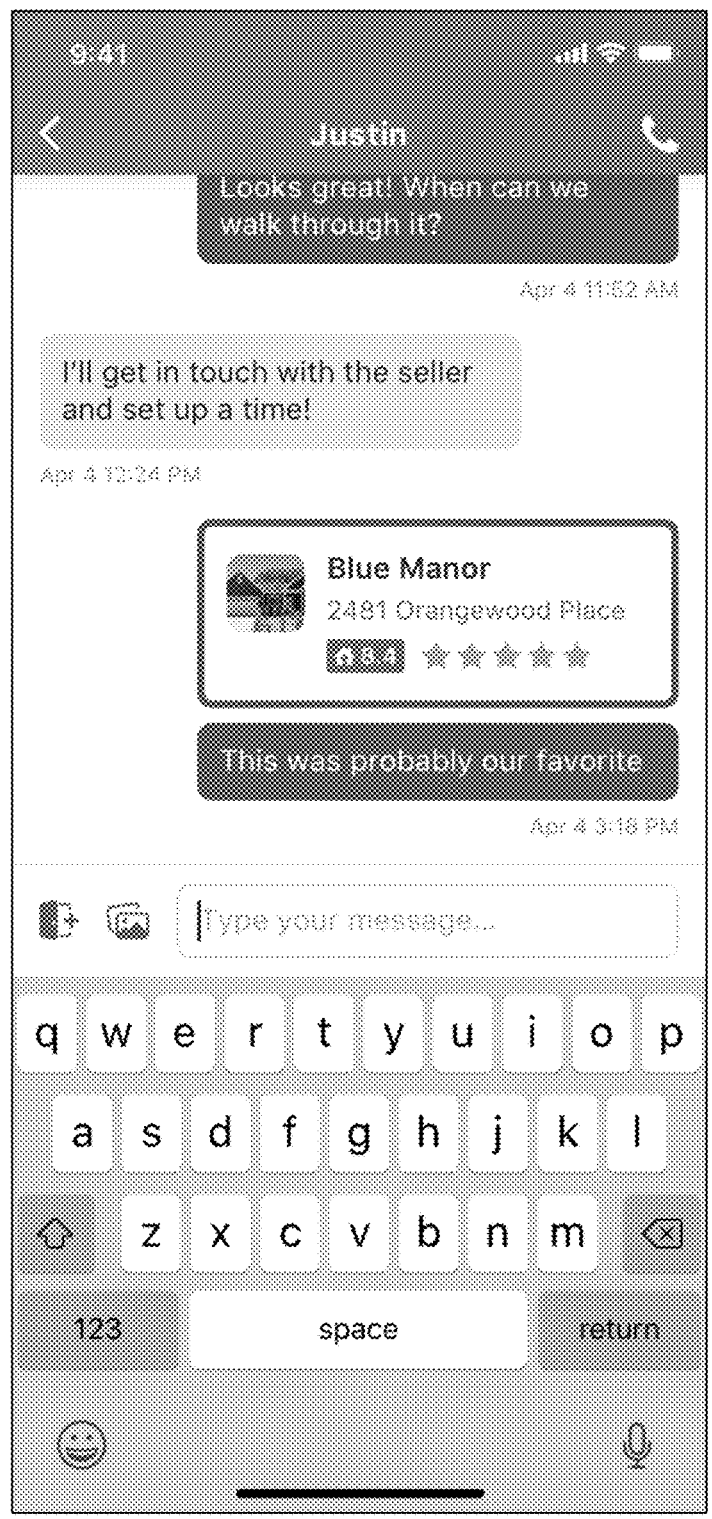
FIG. 11 illustrates an example graphical user interface for providing messaging between instances of the property evaluation application.

In some implementations, listings, videos, notes, preferences, attributes, etc., may be transmitted via messages via the application server 122, for example, between instances of the property evaluation application 108. In some instances, a first instance of the property evaluation application 108 may generate a message including data describing the scored first property, which may transmit the message to a second instance of the property evaluation application 108 based on a defined role of the user (e.g., particular buyer) and a second user (e.g., an agent). For example, as illustrated in FIG. 11, a graphical user interface 1100 for messaging between users of the property evaluation application 108 may allow users to communicate efficiently. As illustrated, data describing the property, its score, a subjective user rating, etc., may be shared between users within the application via the messaging interface.

Figure 9A:
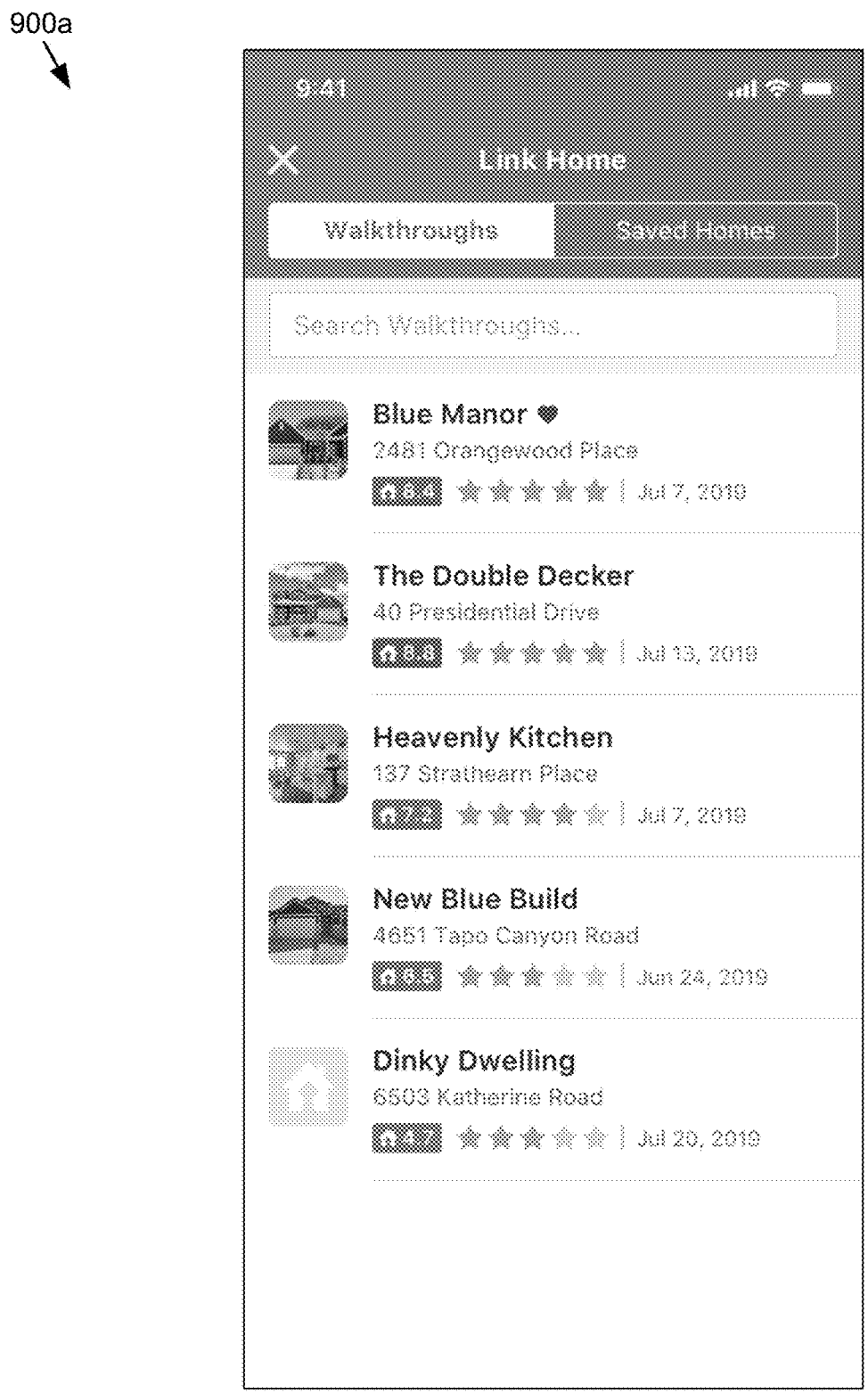
FIGS. 9A-9I illustrate example graphical interfaces that present property data and scores.
Figure 9B:
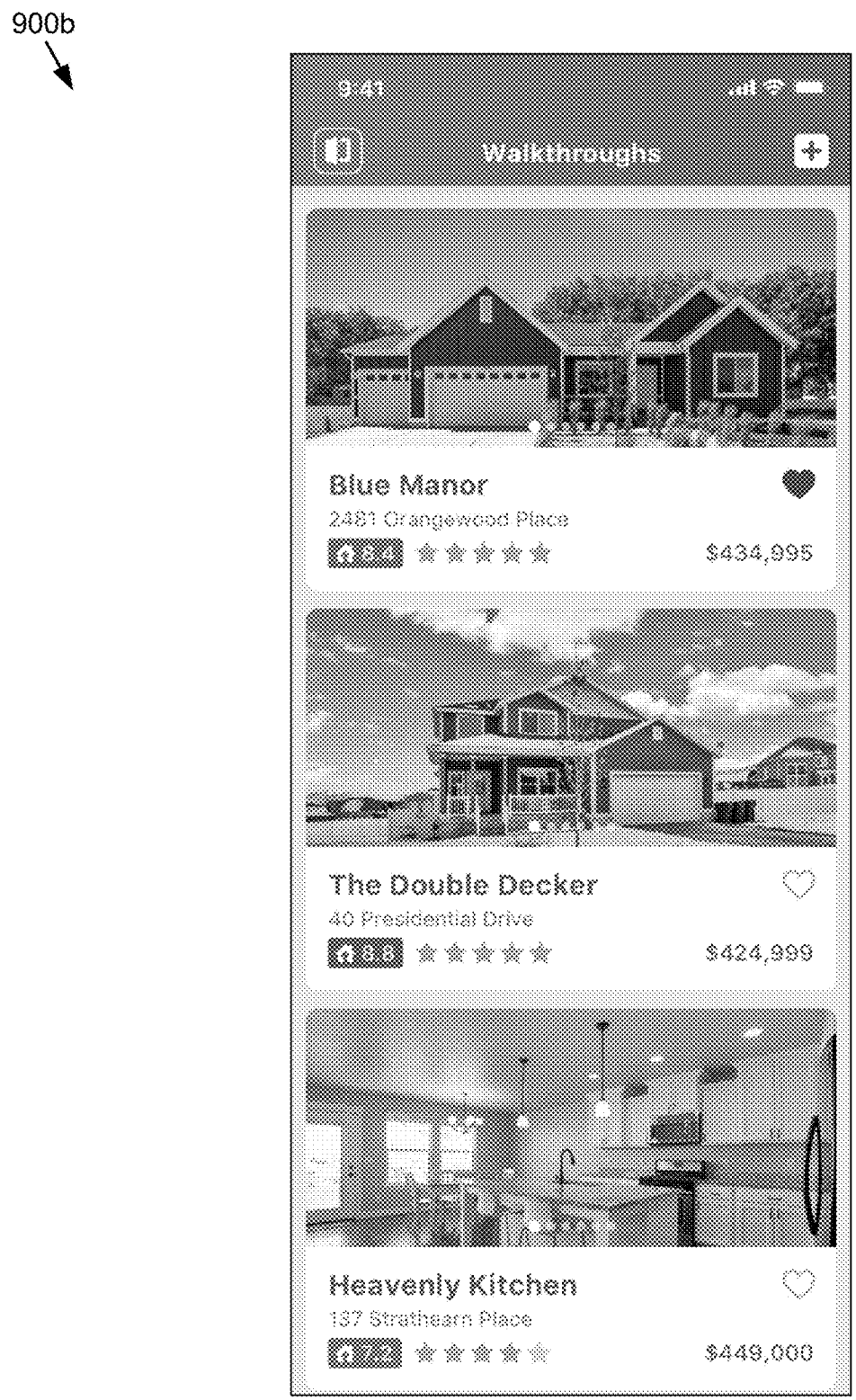

Example generated graphical elements for presenting information are illustrated in FIGS. 9A-9I. For example, FIG. 9A illustrates a graphical user interface 900a showing graphical representations of a plurality of properties. For instance, each element may include a nickname of the property, its address, its star rating, the date added or toured, a photograph captured by the user or downloaded from the MLS server, and/or a total score for the property. FIG. 9B illustrates an interface 900b that displays similar information to the interface 900a but in a different format. For instance, the property evaluation application 108 may change the format based on the quantity of properties, scores, and/or size of the client device display. In some implementations 900a may be presented on a smaller display or where there are more properties (or more properties with scores satisfying a threshold for display).

Figure 9C:
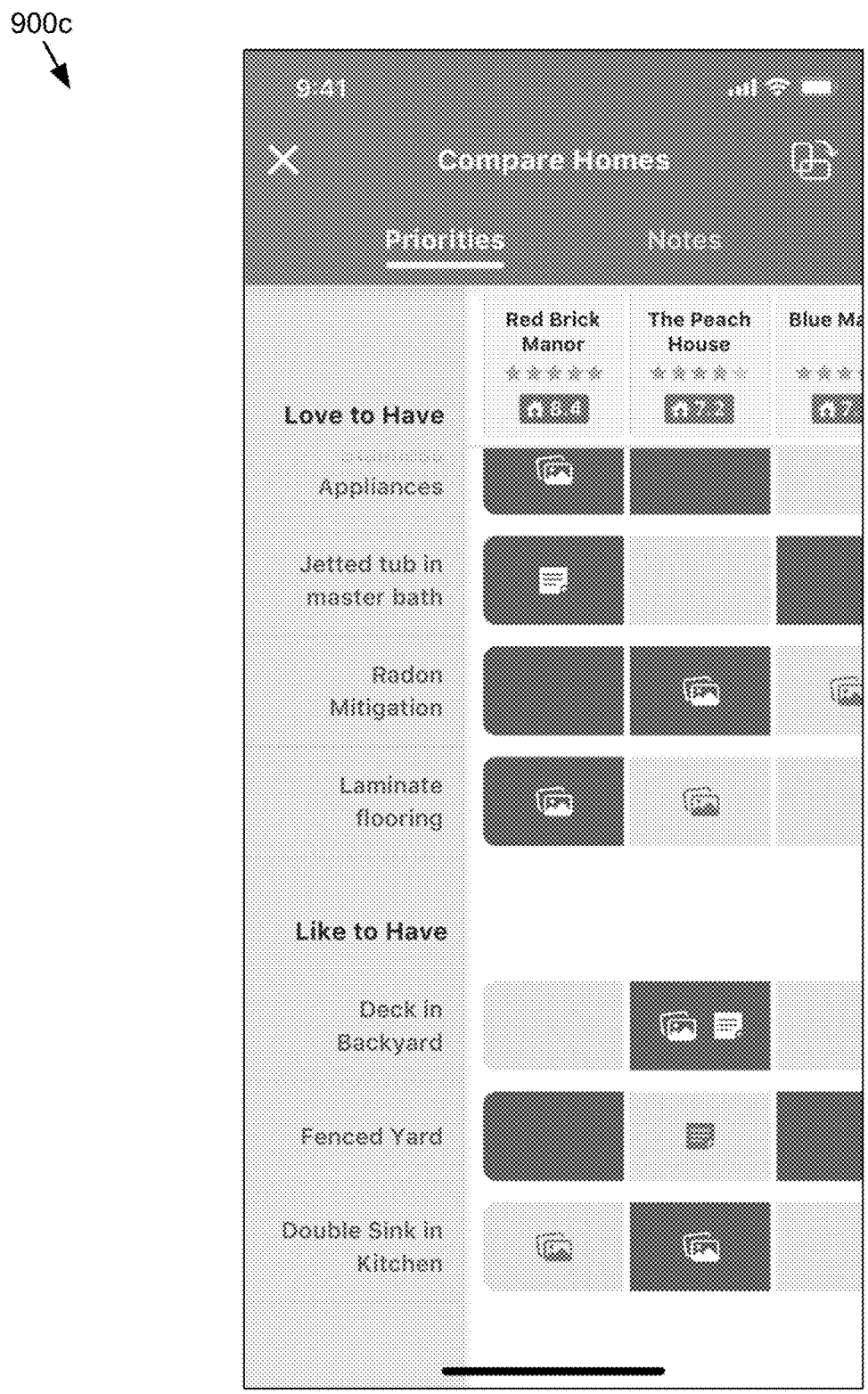
Figure 9D:
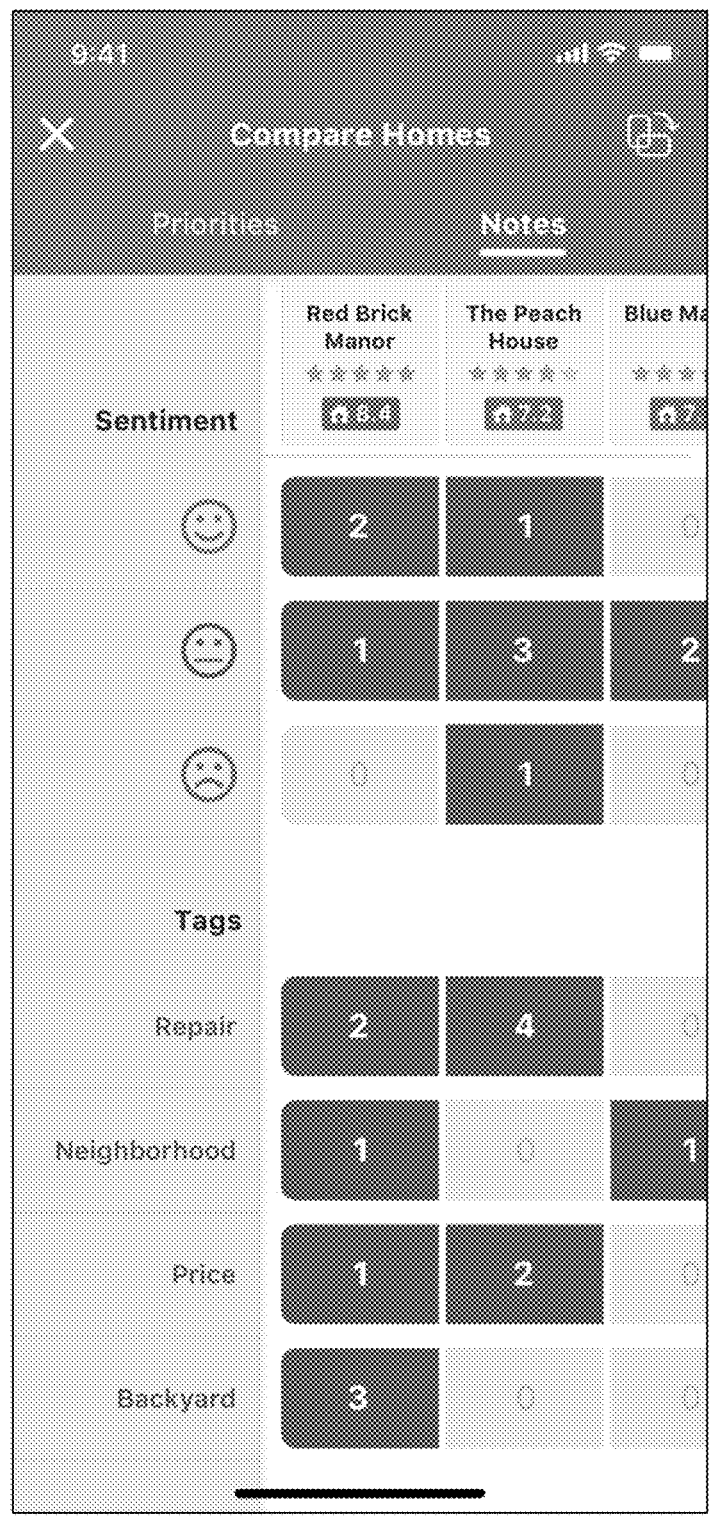

FIGS. 9C and 9D illustrate interfaces 900c and 900d, respectively, which show a comparison chart for multiple attributes (e.g., represented by rows, potentially divided by attribute grouping, weight, or ranking) and multiple properties (e.g., represented by columns). The attribute values (e.g., presence or absence of attributes) may be indicated by graying squares or by another indicator. Similarly, scores, notes, images, etc., may be represented in those squares. In some implementations, the interface 900d may display sentiments and/or tags (e.g., repair, neighborhood appeal, price appeal, backyard appeal, etc.) and indicate a quantity of each associated with each property. As described above, the sentiments and/or tags may affect the attribute values, attribute scores, and/or total scores for properties.

Figure 9E:
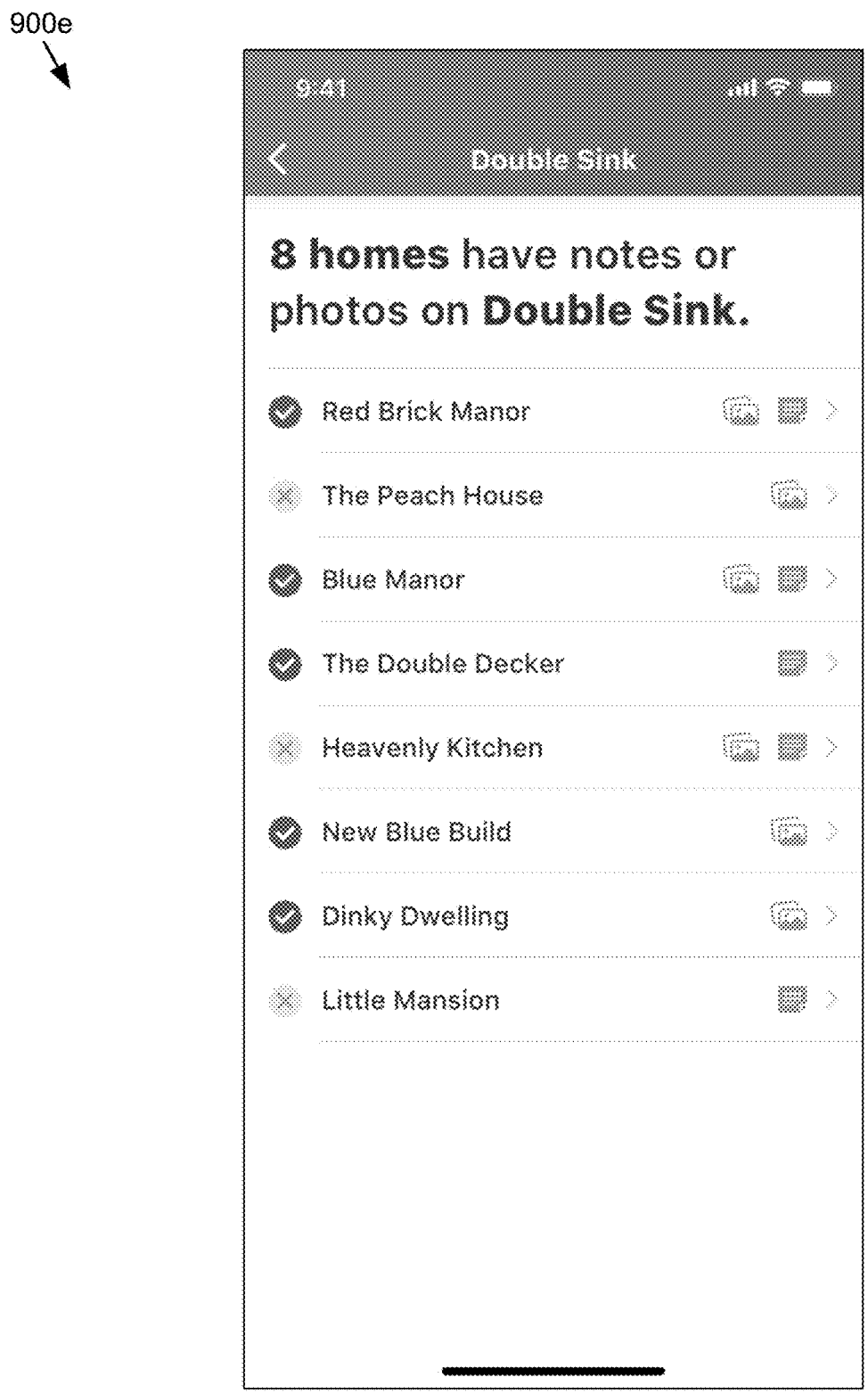

FIG. 9E illustrates an example interface 900e indicating which property(ies) include a certain attribute. For instance, a user may select or search for a particular attribute among the properties to indicate which properties include that attribute, as illustrated.

Figure 9F:
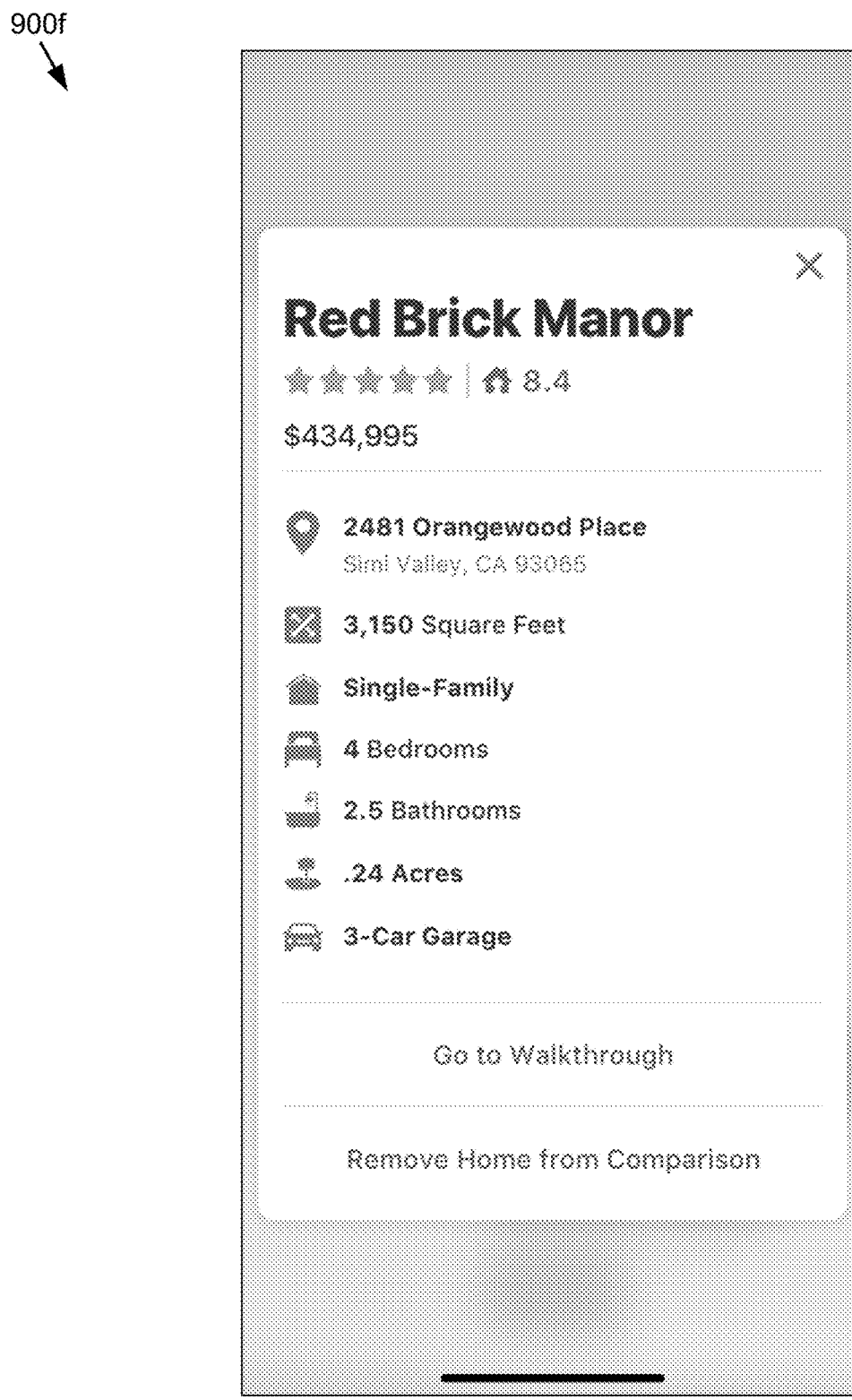

FIG. 9F illustrates an example interface 900f, which shows details describing a property along with the score for the property. In some implementations, the interface 900f may display data from one or more of the MLS server, user (e.g., from the notes described elsewhere herein), property evaluation application 108 (e.g., the computed score(s)), and/or from another user (e.g., an agent, co-buyer, etc.) on another instance of the property evaluation application 108.

Figure 9G:
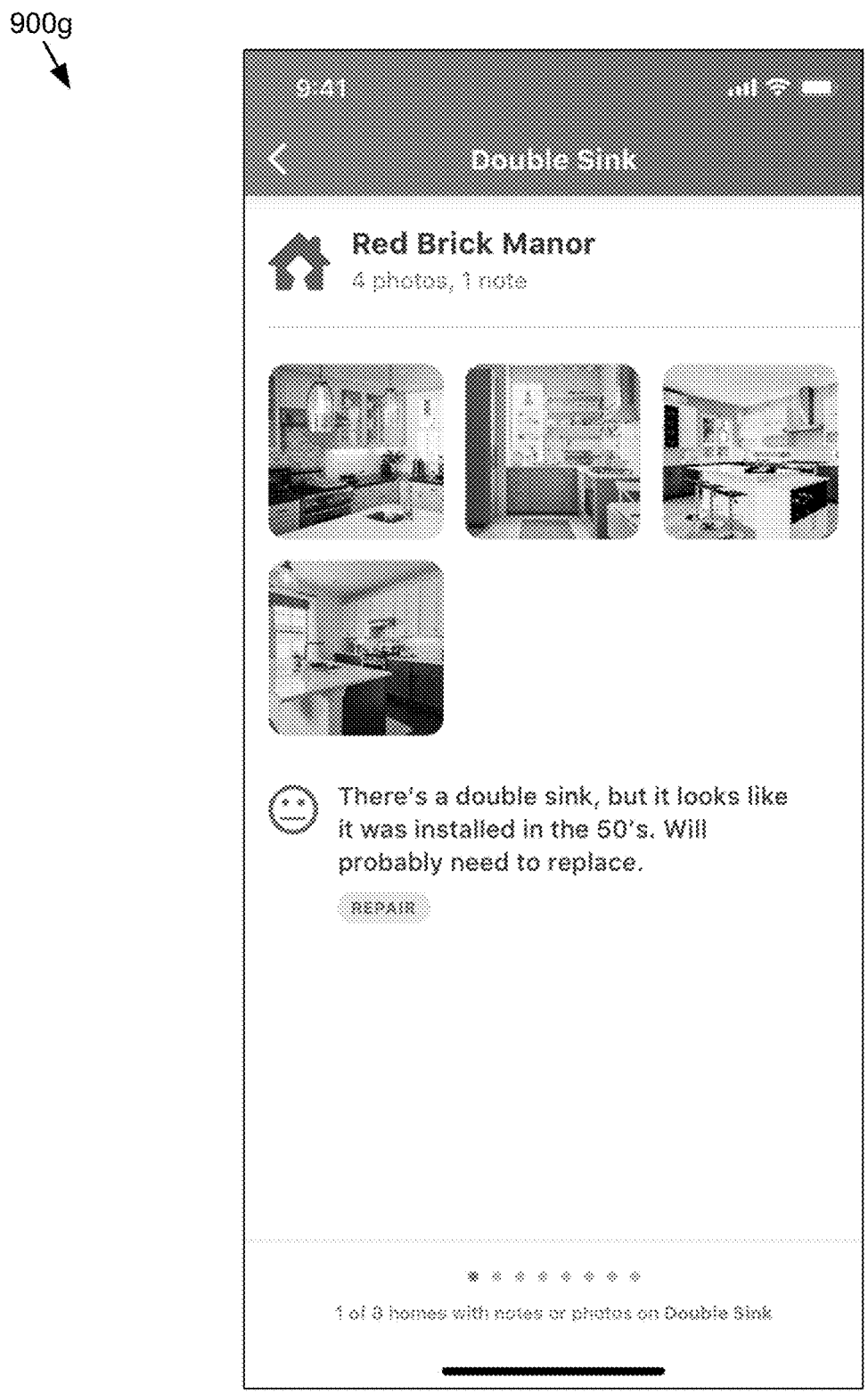
Figure 9H:
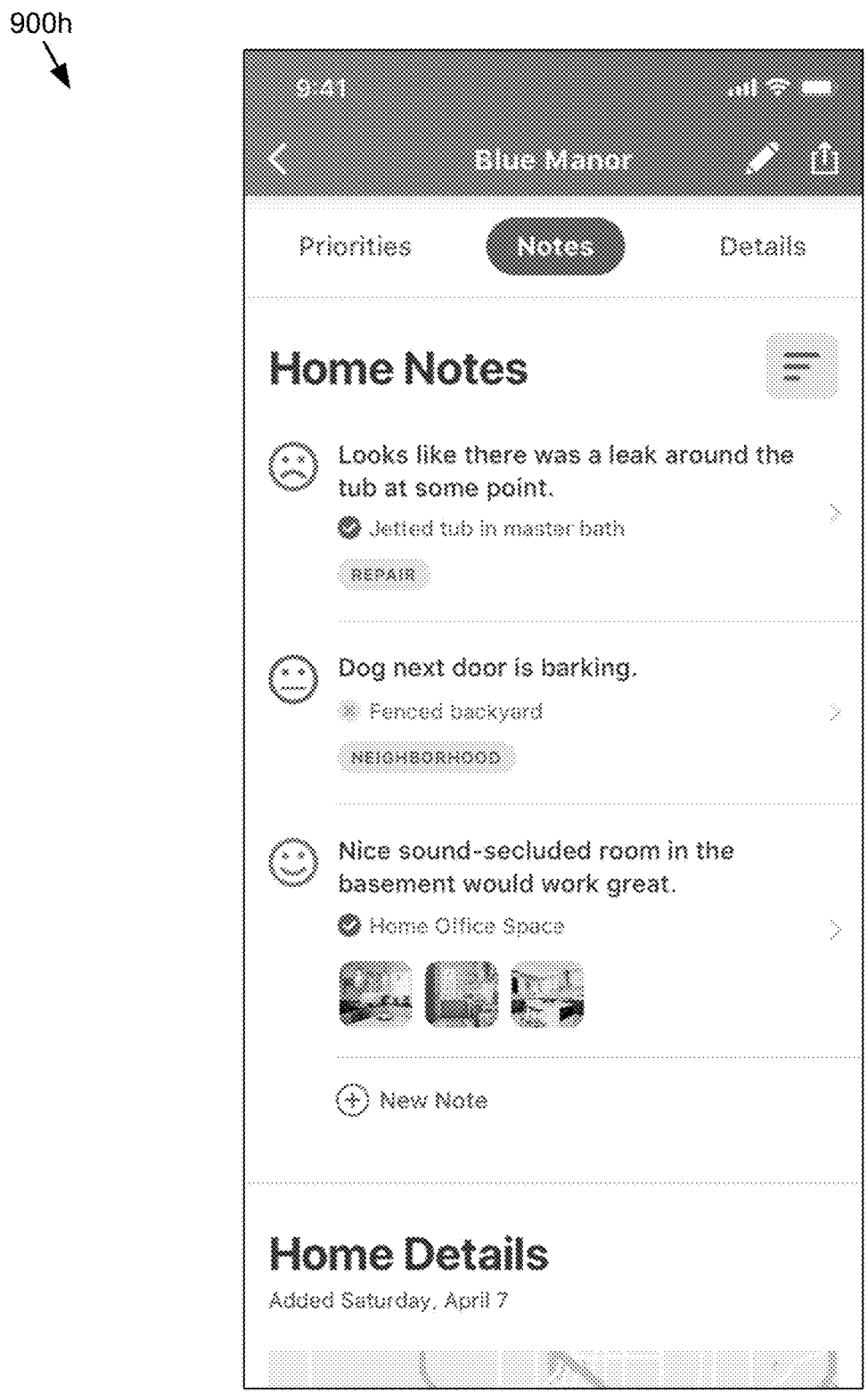

FIG. 9G illustrates an example interface 900g, which displays notes, such as photographs, textual notes, sentiments, tags, etc. Similarly, FIG. 9H illustrates an example interface 900h with notes, sentiments, tags, etc., for a home in a different format. The interfaces 900g and 900h may allow additional notes and details to be captured, used (e.g., to search for property listings and/or update scores), and displayed.

Figure 9I:
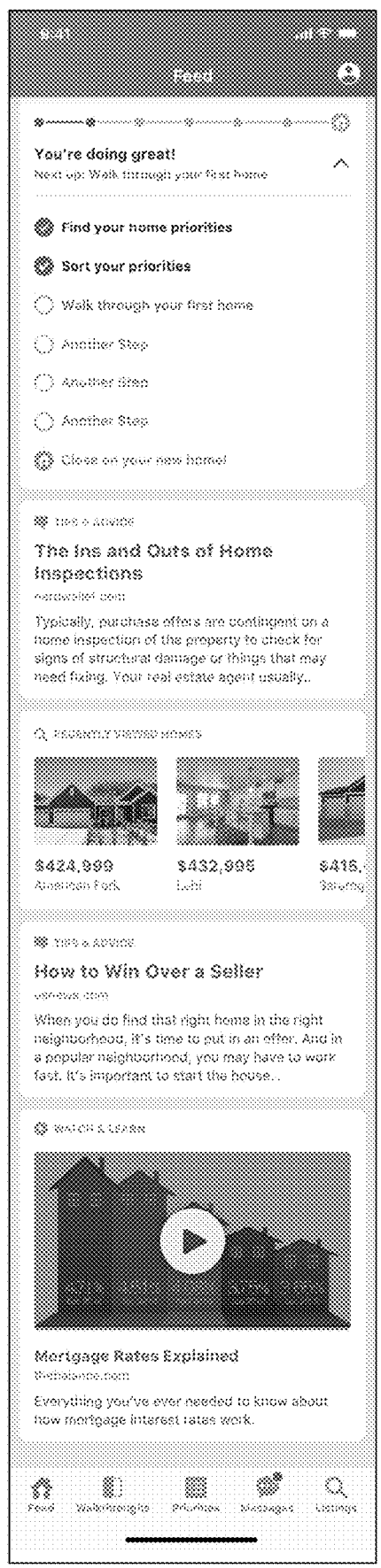

FIG. 9I illustrates an example interface 900i, which includes various automatically updating graphical elements. For instance, the property evaluation application 108 may display the progress through scoring properties and/or completing a real estate purchase. In some instances, the interface 900i may provide various educational resources based on the step of the progress, as described above. For instance, an agent may provide educational resources specific to the user, progress point, or property, and/or may update the progress so that the property evaluation application 108 automatically displays or emphasizes information based on the progress.

Figure 10A:
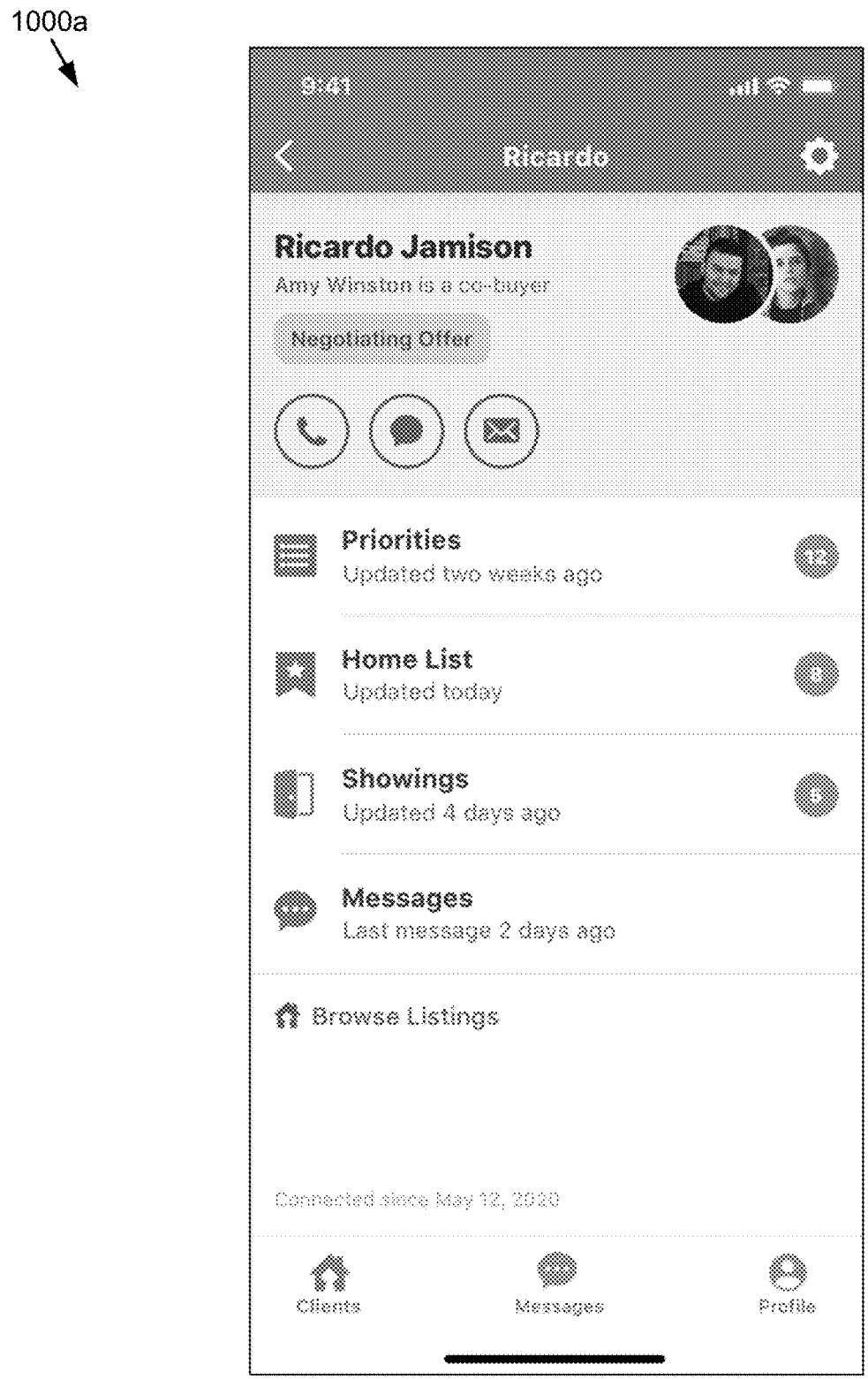
FIGS. 10A and 10B illustrate agent-specific views of various property data, attributes, and client information.
Figure 10B:
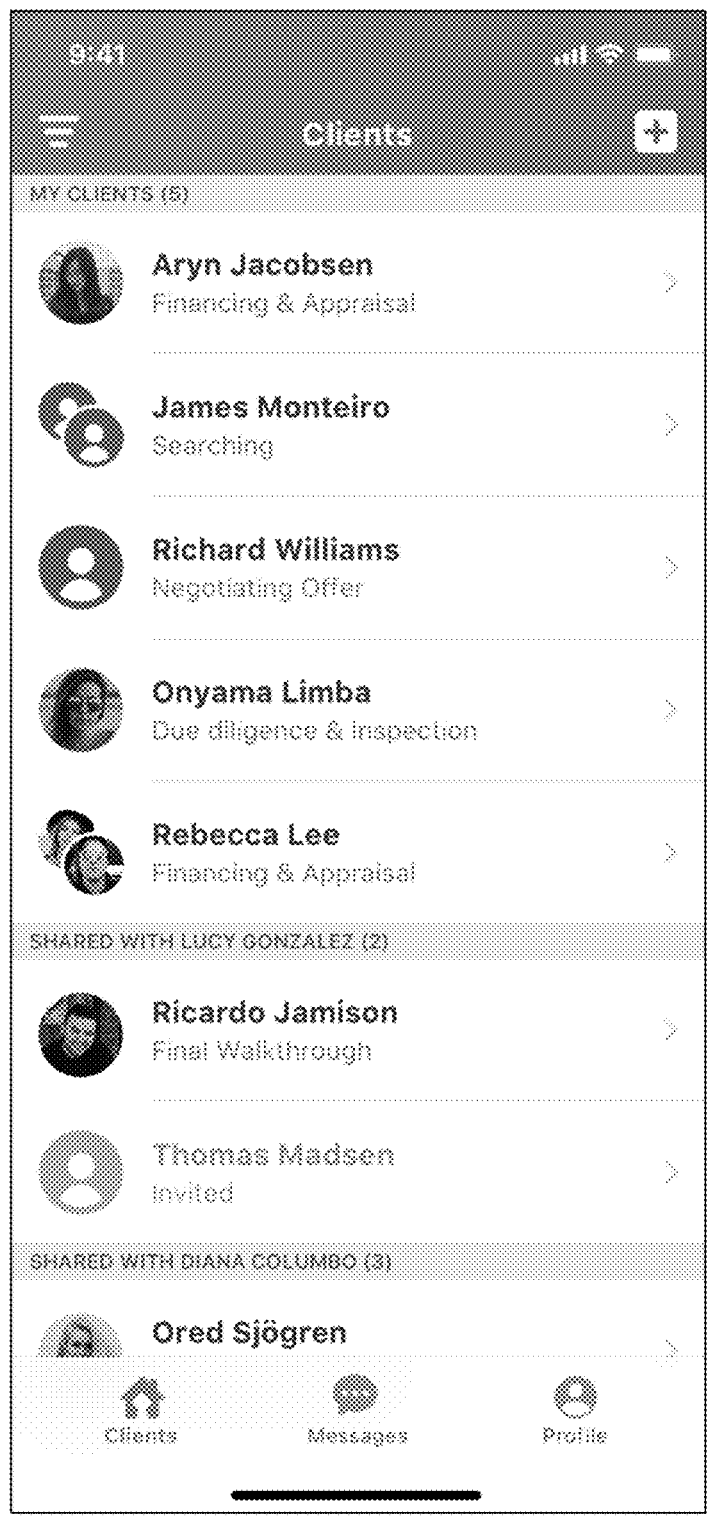

In some implementations, different interfaces may be displayed on an agent's instance of the property evaluation application 108. For example, FIGS. 10A and 10B illustrate agent views of various data. FIG. 10A illustrates an interface 1000a displayed to an agent by the property evaluation application 108. For example, the property evaluation application 108 may display a client's name, progress through the real-estate evaluation or purchase process, the user's priorities, bookmarked properties, showings and notes, and/or messages (e.g., as described above) with the client. The property evaluation application 108 may automatically update the interface 1000a based on the client's actions (e.g., attribute selection or weighting, note taking, etc.).

FIG. 10B illustrates an interface 1000b showing progress across multiple clients. For instance, a client may be selected from the interface 1000b to display information specific to that client (e.g., as illustrated in FIG. 10A). In some instances, the agent may view and/or modify information (e.g., weights, values, attributes, etc.) through this centralized method.

FIG. 3B illustrates an example method 320 for determining weights associated with property attributes using user inputs and the set of queries. For example, one or more of the operations of the method 320 may provide additional or alternative features for the operations at 306 described in reference to FIG. 3A.

In some implementations, at 322, the property evaluation application 108 may communicate with the server of an MLS to request data based on preferences for property attributes and, at 324, receive data describing one or more properties from the MLS server. For example, the property evaluation application 108 and/or component of the application server 122 may communicate with a server (e.g., the third-party server 118) of an MLS via an application programming interface to request data describing one or more properties.

In some implementations, the property evaluation application 108 may automatically search for property listings on the MLS using the preference(s) for the set of attributes, the set of queries, and/or the responses to the queries. For instance, the property evaluation application 108 may automatically download data describing a plurality of property listings from an MLS server based on the preferences for attributes selected by the user, as described above.

Beneficially, the property evaluation application 108 brings criteria and priorities defined by the user into MLS searching, which may automatically update when the user changes priority sorting, as described elsewhere herein. Accordingly, when a user re-orders priorities for attributes or adds a new attribute priority, the property evaluation application 108 may automatically retrieve listings from an MLS server based on these changes and may automatically score the newly retrieved listings and/or re-score the previously scored listings.

In some implementations, at 326, the property evaluation application 108 may sort attributes into groupings based on the set of queries. For example, as described in detail in reference to operations 304-308, attributes may be ranked and, based on their rankings placed into groups indicating their relative priorities (e.g., must have, like to have, neutral, etc.).

In some implementations, at 328, the property evaluation application 108 may provide a graphical user interface adapted to allow attributes to be reordered and/or regrouped.

Figure 7A:
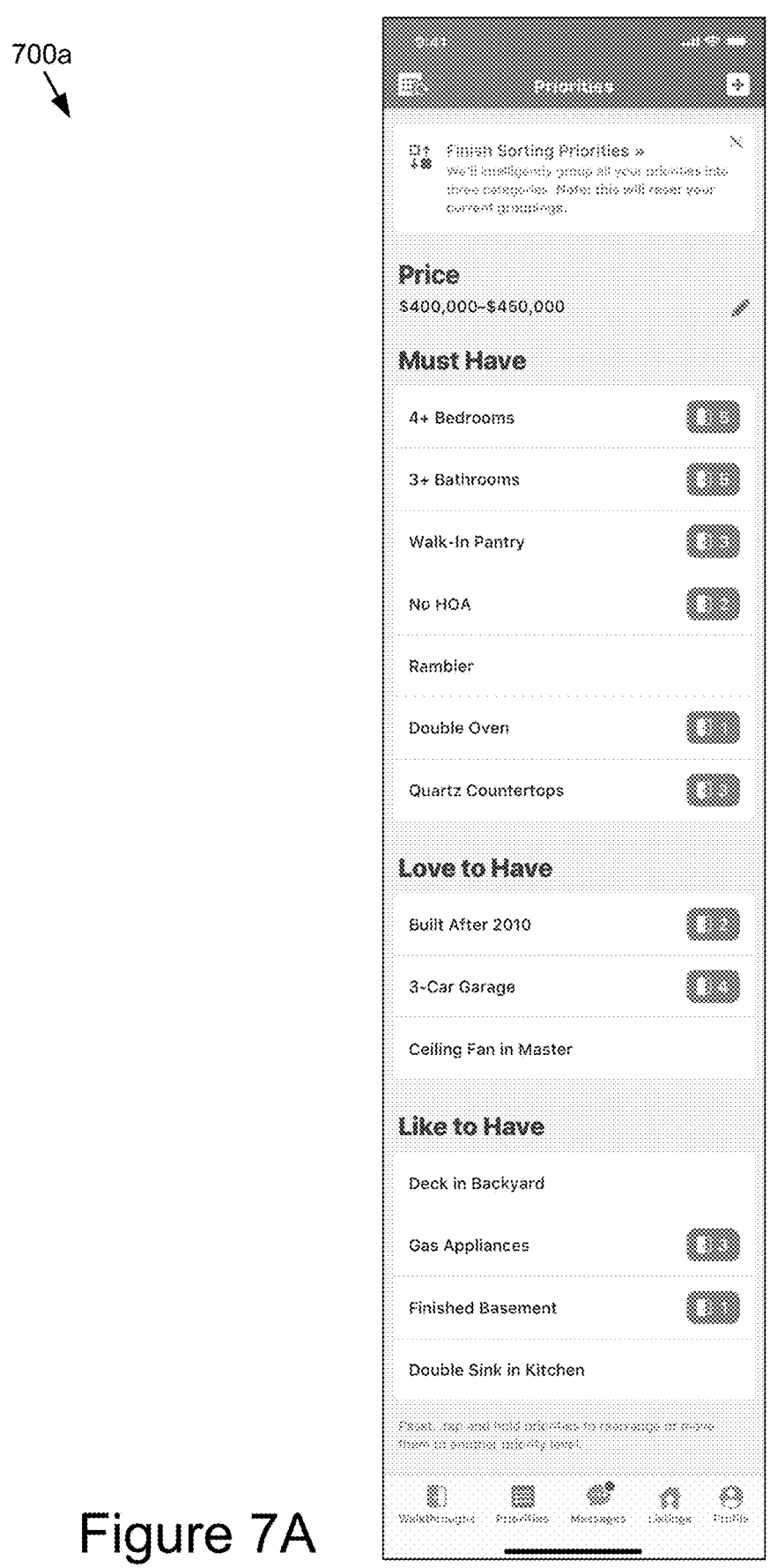
FIGS. 7A-7C illustrate example graphical user interfaces for displaying, prioritizing, or modifying preferences and/or weights.
Figure 7B:
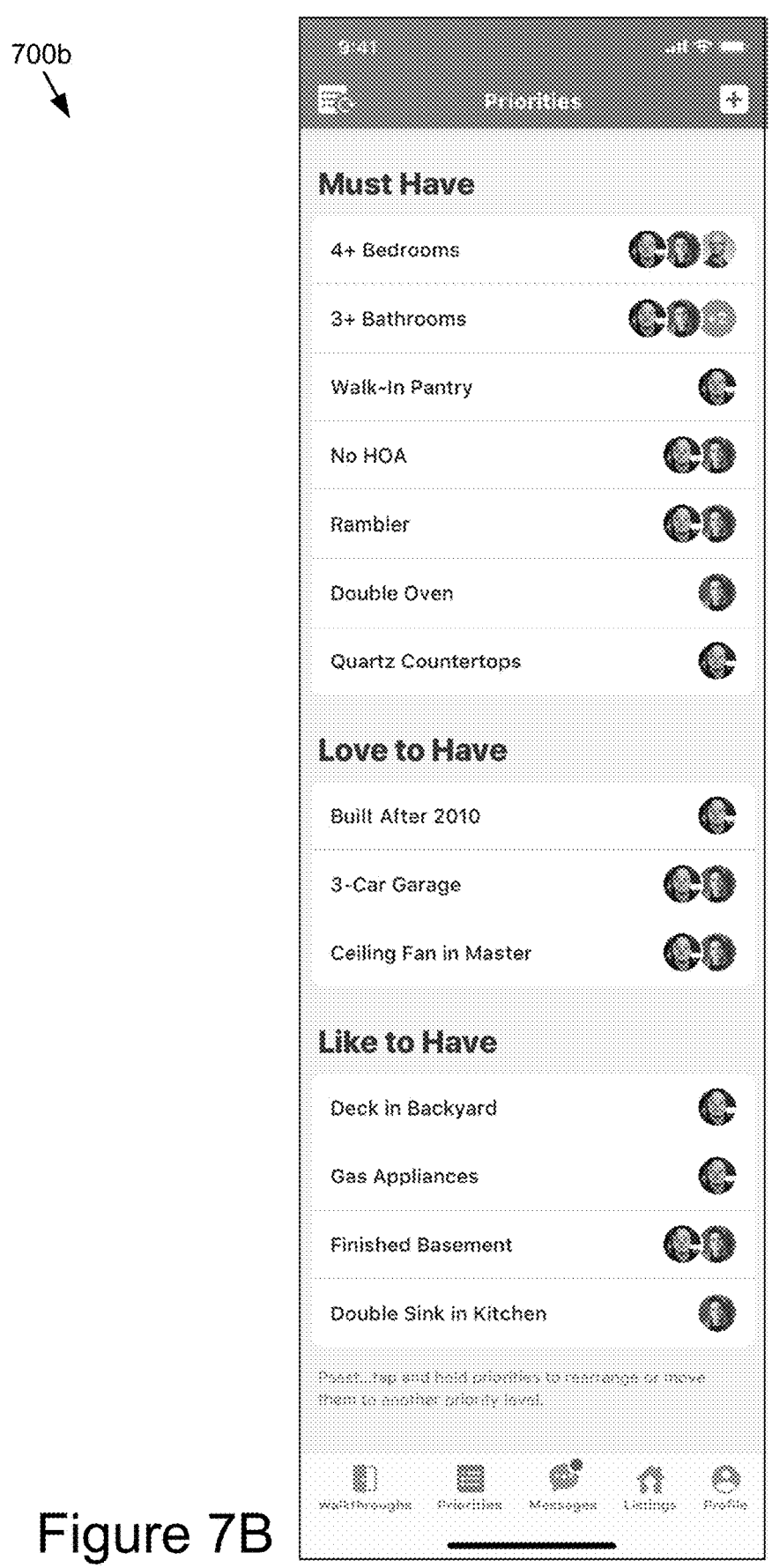
Figure 7C:
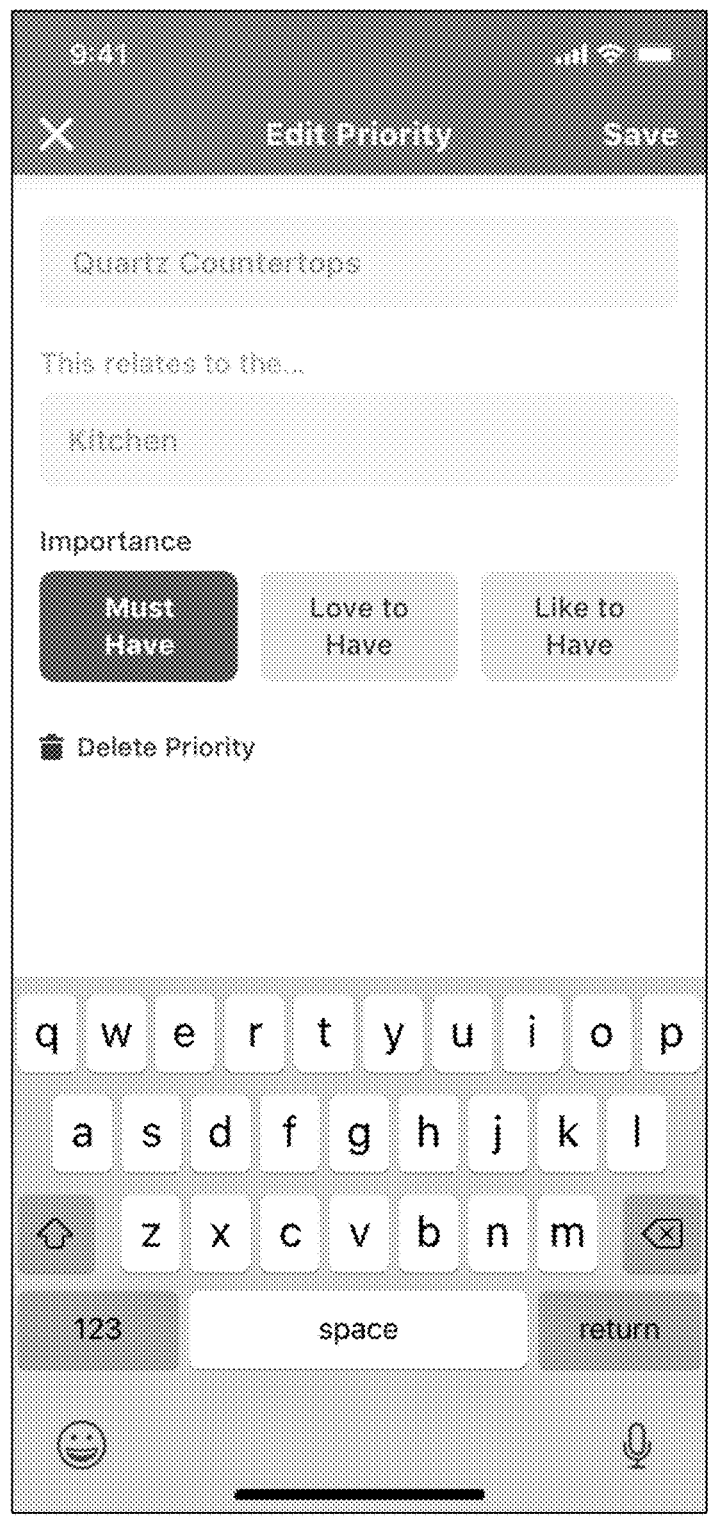

Example generated graphical elements for displaying, prioritizing, or modifying preferences and/or weights are illustrated in FIG. 7A, FIG. 7B, and FIG. 7C. For example, FIG. 7A is an example graphical user interface 700a illustrating a set of preferred attributes sorted into groupings, which may correspond to determined weights. In some implementations, the graphical elements for each attribute indicating a quantity of notes or properties having that attribute. In some implementations, a user may drag attributes to different positions in the ranking and/or to different groupings thereby adjusting the weights/relative importance of attributes.

FIG. 7B is an example interface 700b similar to the interface 700a but, instead of being displayed to a buyer it may be displayed on an instance of the property evaluation application 108 of an agent. For instance, an agent may be associated with a plurality of buyers and the interface may indicate a quantity and/or identity of buyers/clients that are requesting each attribute (e.g., based on the synchronization described elsewhere herein) and/or other information.

FIG. 7C illustrates an example interface 700c for manually modifying a weight or grouping of a particular attribute. For instance, a user may select an attribute from the interface 700a or 700b and the interface 700c may allow the user to change the weight/grouping of the attribute.

Returning to FIG. 3B, in some implementations, at 330, the property evaluation application 108 may receive input reordering or regrouping one or more attributes via a graphical user interface. For instance, the property evaluation application 108 may receive an input indicating that the user has manually moved a given attribute from a first attribute grouping to a second attribute grouping. In another instance, a user may manually change a priority order of the given attribute among the set of attributes. For instance, this move, or another operation, may modify the weight of the given attribute.

In some implementations, at 332, the property evaluation application 108 may score or re-score the one or more properties based on the input reordering or regrouping the one or more attributes. In some instances, the property evaluation application 108 may also normalize or re-normalize the score and/or weights based on the input.

In some implementations, at 334, the property evaluation application 108 may automatically update the retrieved property data via communication with the MLS. For instance, the property evaluation application 108 may automatically update the MLS search based on the received modification, as described above.

In some implementations, at 336, the property evaluation application 108 may provide, for display on the graphical user interface, data describing the one or more properties from the MLS server with data generated by the property evaluation application 108 including the score for the certain property. For example, the property evaluation application 108 may display the information together on the same graphical element or page, modify the same graphical element, etc., for example, as shown and described in reference to FIGS. 9A-9I.

FIG. 3C illustrates an example method 340 for receiving data describing attribute values of a set of attributes for one or more properties. For example, one or more of the operations of the method 340 may provide additional or alternative features for the operations at 308 described in reference to FIG. 3A.

In some implementations, at 342, the property evaluation application 108 may communicate with the MLS server to request and receive data describing properties. As described above, in some instances, the property evaluation application 108 may communicate with the MLS server (or another server 118 or 122) to send and/or receive data packets, such as via an API or other communication interface.

In some implementations, at 344, the property evaluation application 108 may determine initial attribute values for attributes of a property based on the received data describing the properties. A property listing may include data fields, which may correspond to certain attributes indicated as preferred by the user (e.g., at 302). The property evaluation application 108 may automatically identify that a data field of the MLS listing corresponds to the attribute and may use the data field to determine an initial attribute value. For instance, a preferred attribute may indicate that a second kitchen is desired and the MLS listing may indicate a second kitchen is present. Accordingly, the property evaluation application 108 may apply a value of 1 (e.g., 0 if not present or 1 if present) to the weight of the preferred attribute. In some instances, the attribute value may be non-binary.

Similarly, in some implementations, for preferred attributes that are not present in data fields of an MLS listing, the property evaluation application 108 may use textual search to search for data in a property description or may leave the attribute value at zero (e.g., thereby reducing the score until a user inputs the value) or blank (e.g., so the attribute, attribute weight, and blank attribute value are not used in score calculation) or it may request/allow input of the value from the user.

In some implementations, the property evaluation application 108 may compare a value to a preferred attribute quantity. For example, if a user indicates a preference that a house have 0.5 acres and a data field of a listing indicates that a property has 0.4 acres, the property evaluation application 108 may determine an approximate attribute value based on similarity between the two values. The range or scaling of similarity-based values may be user defined (e.g., a buyer, agent, or administrator may set a similarity to attribute value ratio). In some instances, the ratio/scaling of similarity may be based on the relative importance of the attribute to a user. For example, if an attribute weight is high, deviation from the preferred quantity may be more detrimental to the attribute value (e.g., if a user strongly prefers 0.5 acres, a 0.3 acre lot would have a low value, such as 0.2), while lower weights may provide more leeway (e.g., if a user weakly prefers 0.5 acres, a 0.3 acre lot may have a higher value, such as 0.5).

In some instances, the property evaluation application 108 may use machine learning to determine a similarity-to-attribute value ratio. For example, the property evaluation application 108 may train a supervised learning model for a certain user (or group of users) based on the fact that a user indicates that she prefers 0.5 acres but typically saves or rates properties with 0.3 to 0.7 acres highly. The trained model may allow more deviation from the preferred quantity of 0.5 for a given attribute value. Such models may be trained across one or many users for each attribute, for example.

In some implementations, at 346, the property evaluation application 108 may score the properties using attribute weights and initial attribute values from the MLS server. For example, the property evaluation application 108 may multiply a weight by a value of each preferred attribute and may add the resulting attribute scores to determine the total score for a property. Computing the scores may be performed using various operations or algorithms, as described in further detail elsewhere herein.

In some implementations, at 348, the property evaluation application 108 may provide a graphical user interface including data from the MLS server in association with scores of the one or more properties, for example, as shown and described in reference to FIGS. 9A-9I.

In some implementations, at 350, the property evaluation application 108 may generate note-taking interfaces adapted to receive notes for the properties. For instance, a note may include one or more of a photograph captured on a client device, a textual comment, an indication of approval of the first attribute, other media, or other inputs.

For example, the property evaluation application 108 may present a set of interfaces allowing a user to indicate whether an attribute is present for a particular property. The property evaluation application 108 may provide a property evaluation mode in which a property is identified (e.g., by address, geographic location, MLS listing number, etc.) and then each selected attribute may be evaluated for the property. For instance, the property evaluation application 108 may retrieve MLS data based on an entered MLS number, pre-score the property based on the fields available in the retrieved listing, and then present the attributes (e.g., all those attributes selected by the user at 302) to the user for manual evaluation (e.g., during a walkthrough of the property). In some instances, the attributes may be presented based on their prioritization/grouping listed above.

FIGS. 8A-8G illustrate example note-taking interfaces 800 displayed by the property evaluation application 108 for receiving notes, attribute values, or modifications, as described above.

Figure 8A:
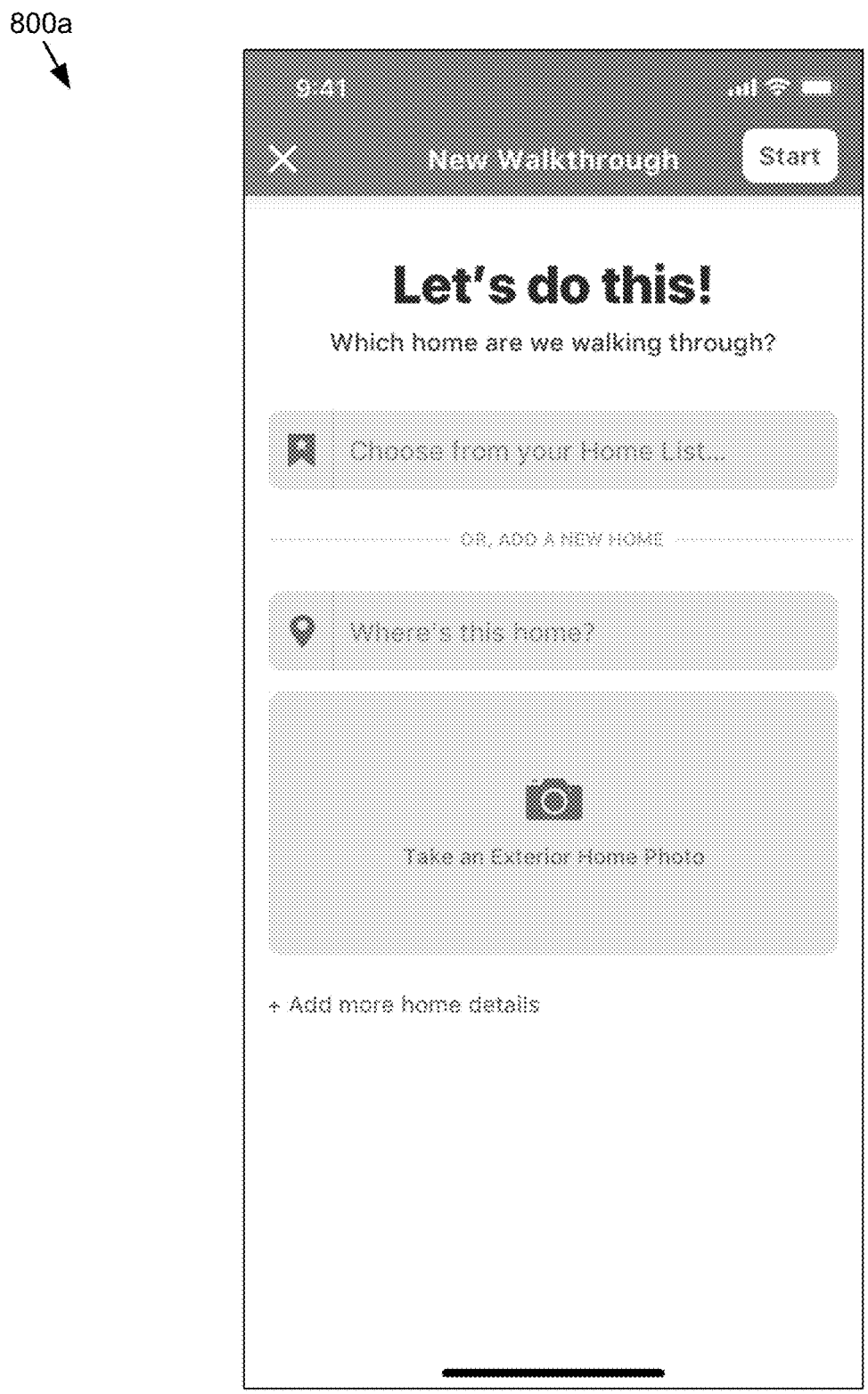
FIGS. 8A-8G illustrate example note-taking interfaces displayed by the property evaluation application for receiving notes, attribute values, or modifications.

FIG. 8A illustrates an example interface 800a for starting a walkthrough or tour of a property. In some instances, the interface 800a may allow a user to select a previous property or add a new property. The interface 800a may capture an image or other notes for the property.

Figure 8B:
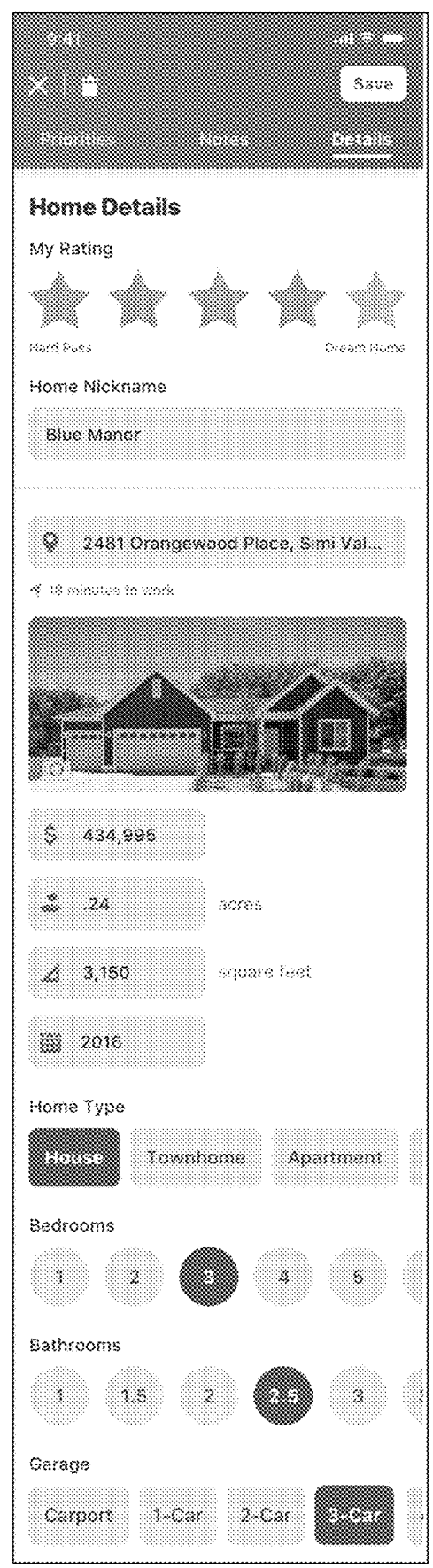

FIG. 8B illustrates an example interface 800b (e.g., a note-taking interface) that describes attributes and values thereof of a property listing, such as square footage, year built, bedrooms, etc. In some implementations, the values of the interface 800b may be pre-filled using data from an MLS and a user may modify the values (e.g., to indicate that a house actually has a different quantity of bedrooms). The interface 800b may also receive an overall rating, which may adjust the overall score, ranking, or display order, of the property.

Figure 8C:
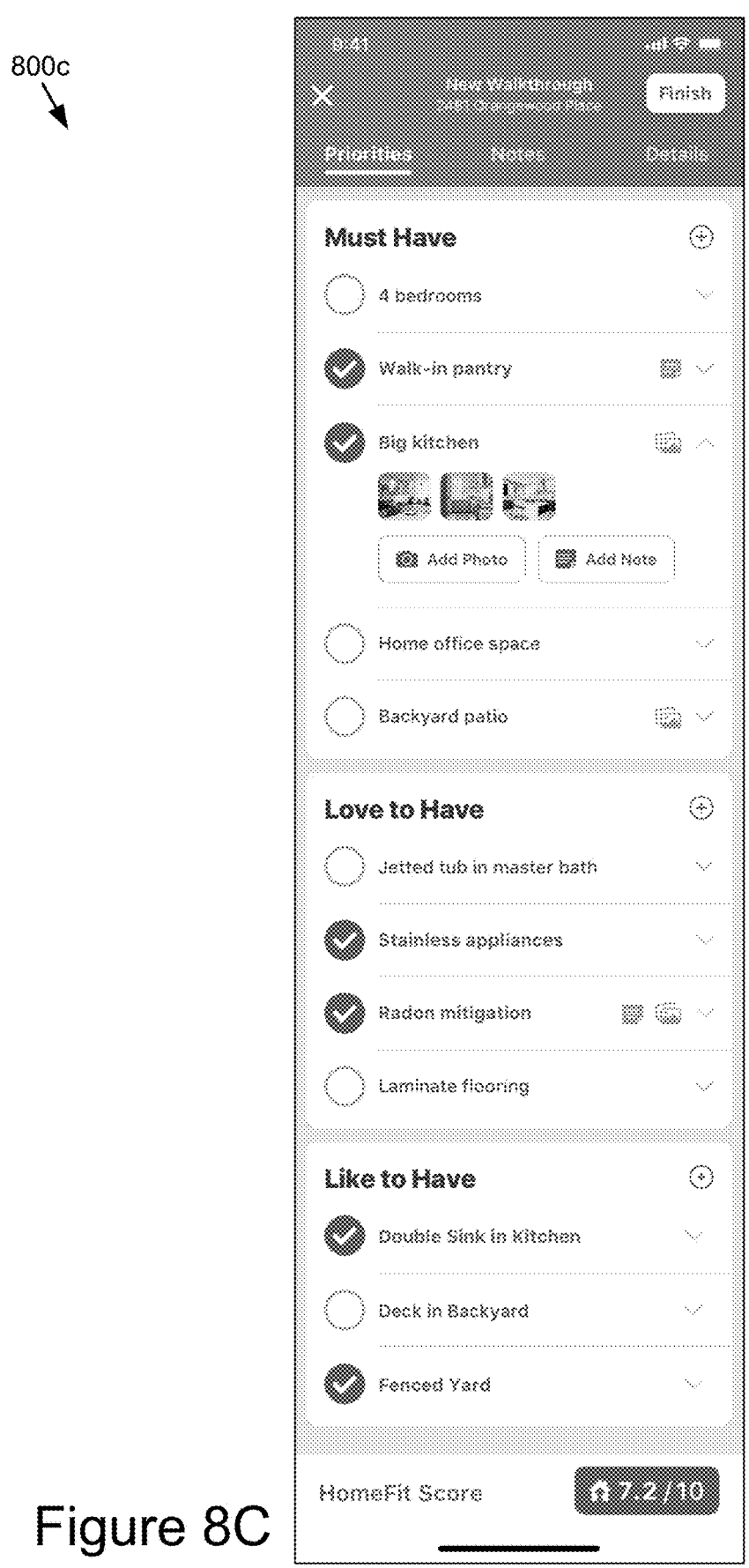

FIG. 8C illustrates an example interface 800c for receiving attribute values. For instance, attributes may be graphically represented along with note fields, photographs, etc., and may include checkboxes indicating the presence or absence of the attribute (e.g., an attribute value of 1 or 0). In some instances, a checkbox may be pre-selected using data from a listing (e.g., of an MLS) or another user, as described elsewhere herein.

Figure 8D:
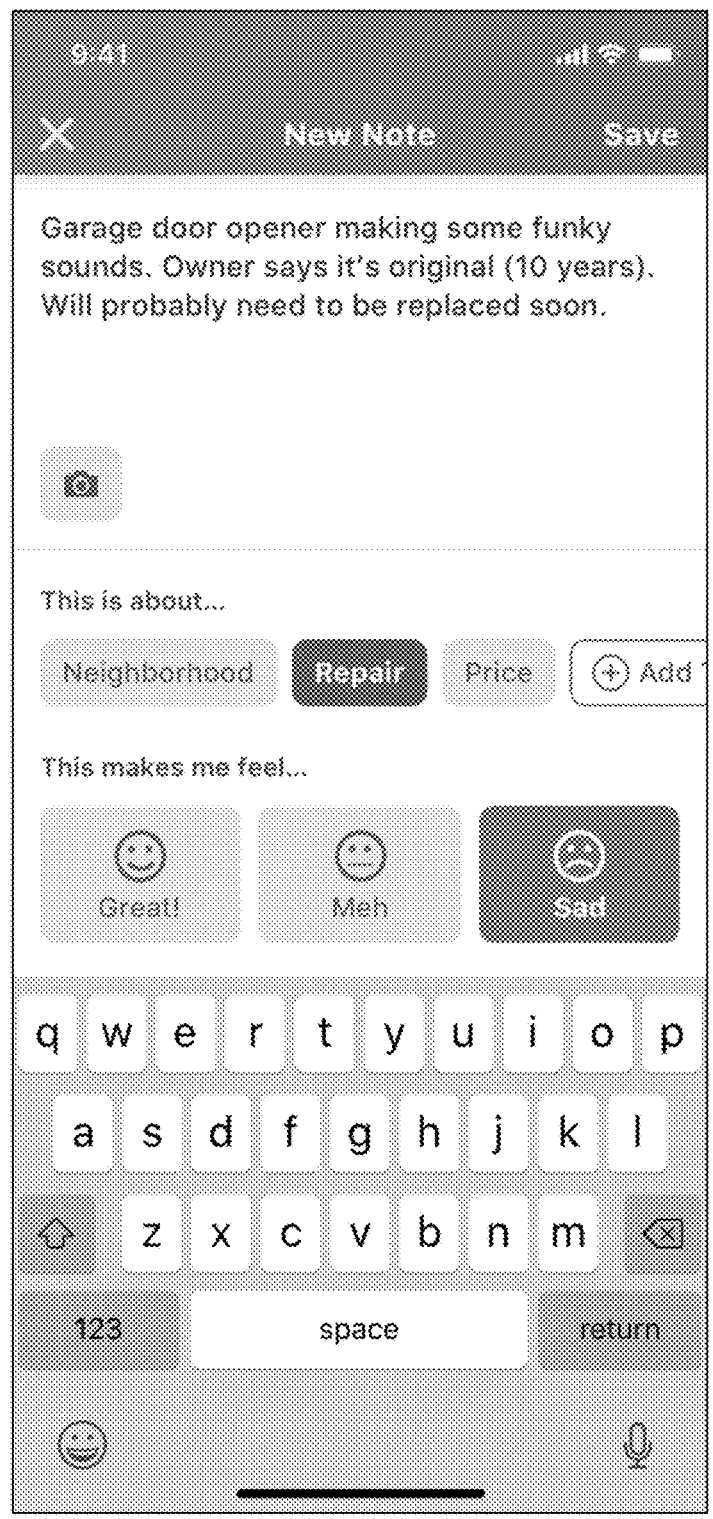

FIG. 8D illustrates an example interface 800d for receiving a note for an attribute. For instance, the note may include text, an image, a tag, and/or other information. For instance, the interface 800d may receive an indication of approval (e.g., "great," "meh," "sad") that affects the attribute value, attribute score, or property score, as described elsewhere herein.

Figure 8E:
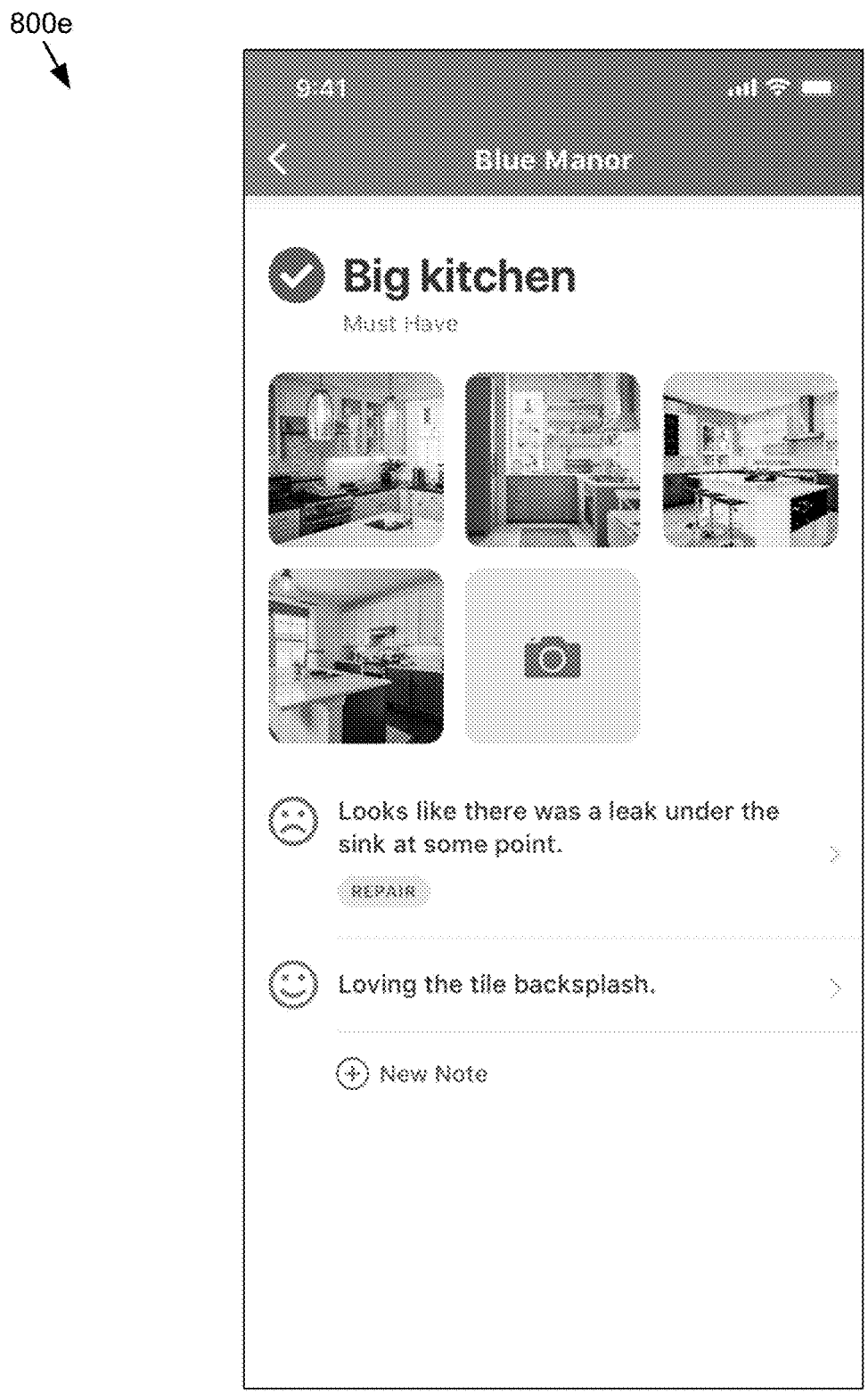

FIG. 8E illustrates an example interface 800e representing notes taken for a certain attribute. For instance, the interface 800e shows images taken, textual comments, and a flag (e.g., "repair needed"). For example, a tag or flag may affect the attribute value, attribute score, or total score.

Figure 8F:
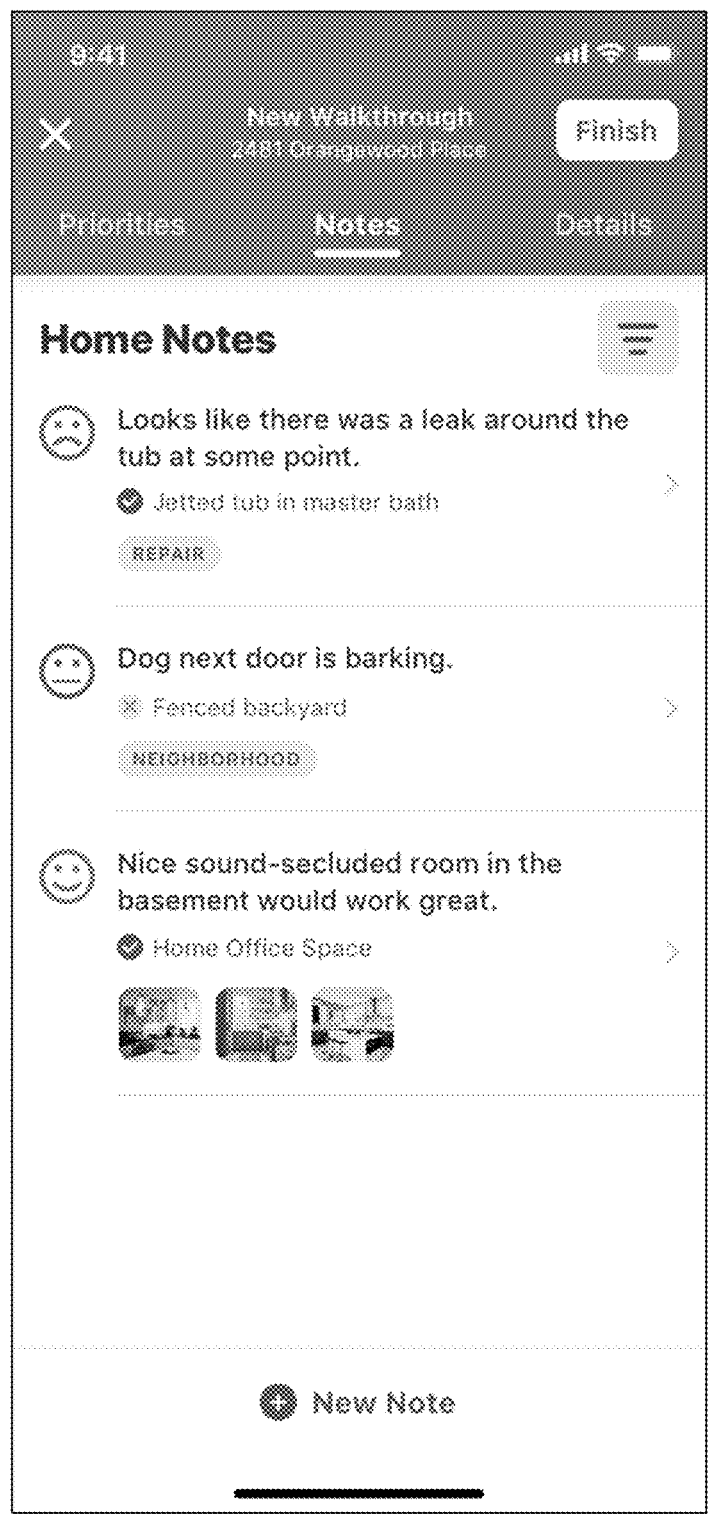

FIG. 8F illustrates an example interface 800f representing notes taken for multiple attributes for a property. As described above, the interface may graphically represent textual notes, flags or tags, indications of approval, photographs, or other details.

Figure 8G:
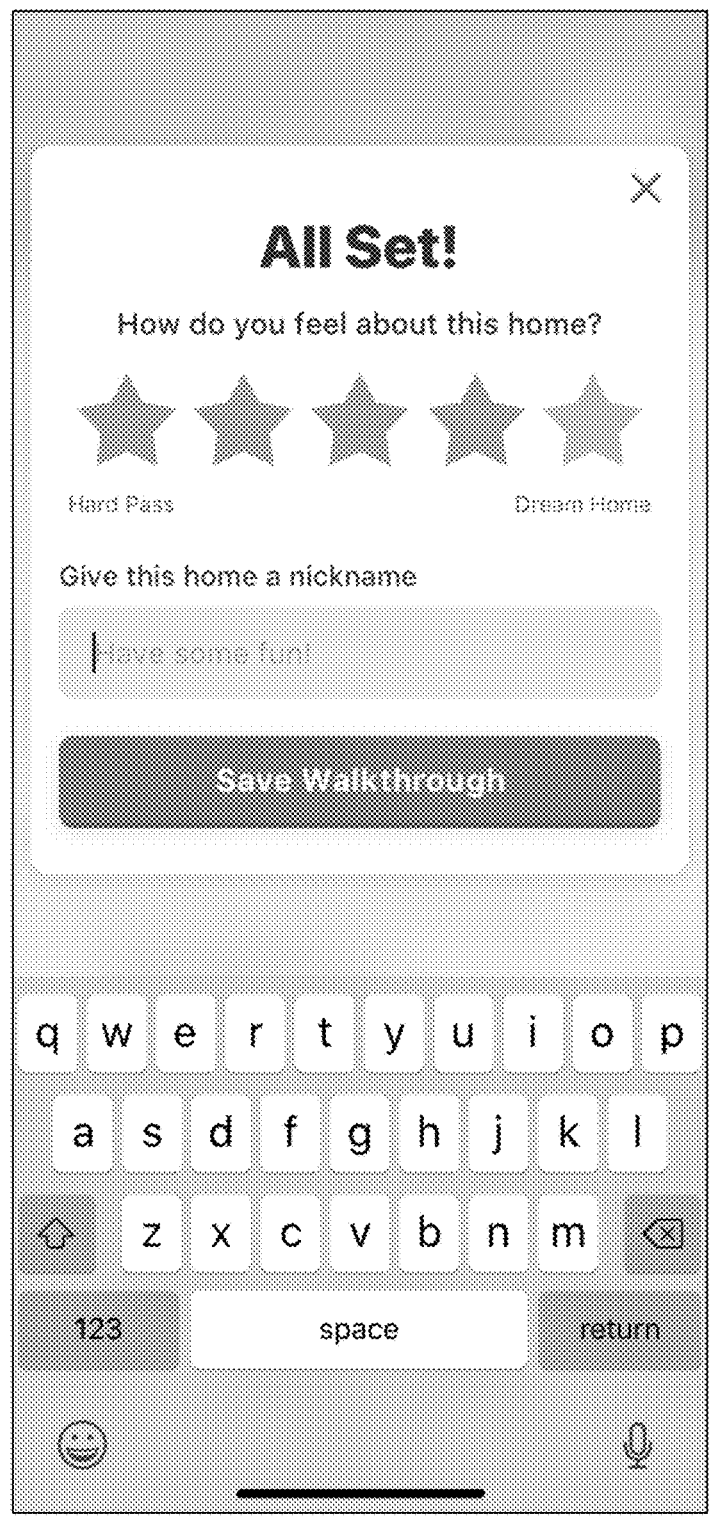

FIG. 8G illustrates an example interface 800g for receiving an overall rating and/or nickname for a property. Depending on the implementation, the overall subjective rating may scale the property score or may act as a separate indication of preference for the property. For instance, the property evaluation application 108 may sort property listings based on a star rating.

Returning to FIG. 3C, in some implementations, at 352, the property evaluation application 108 may automatically fill data fields in the note-taking interfaces using the initial attribute values from the MLS server. For instance, a note-taking interface for a given property may include check boxes, photograph capturing elements, indications of approval, and, in some instances, a list of the set of preferred attributes (e.g., received at 302). The note-taking interface may include check boxes or data entry fields (or sliders, drop down menus, etc.) into which attribute values may be input, for example, automatically by the property evaluation application 108 or manually by the user.

In some implementations, attribute values may be entered by various users or instances of a property evaluation application 108. For example, a buyer may enter an attribute value (e.g., yes, house has built-in hot tub) into the buyer's instance of the property evaluation application 108 or web interface of the property evaluation application 108. The property evaluation application 108 may synchronize data including the entered attribute value with an application server 122 and/or one or more other instances of the property evaluation application 108 (e.g., associated with other client devices and/or user profiles). Accordingly, if an agent or co-buyer enters a value, it may be seen and used for scoring on the device of the buyer or vice versa.

In some implementations, at 354, the property evaluation application 108 may receive a note from the user via the note-taking interface. For example, a user may provide a textual note, a photograph, an attribute value change, or an indication of approval beyond merely indicating that an attribute is or is not present. For example, while touring a particular property, the property evaluation application 108 may provide a convenient note-taking interface where images, comments, indications of approval, etc., are automatically linked and stored in association with specific attributes of the particular property. The property evaluation application 108 may store a digital record of the note in association with the attribute, property, user, transaction, etc. The notes, attributes, attribute values, MLS data, etc., may be displayed on the note-taking or other interface for easy review by the buyer, agent, co-buyer, or other shared user, for instance.

In some instances, the property evaluation application 108 may allow a user to indicate the presence or absence of the prioritized attributes and electronically record the presence/absence. The property evaluation application 108 may electronically record user created notes and photographs specific to the user's criteria/attributes, additional user created notes and photographs specific to the property and its attributes, user entered home details, and may display home details delivered from a 3rd party database (if such database is available), etc., during a walkthrough or tour, for example.

In some implementations, the user may provide additional details for the selected attributes. For instance, the user may indicate a positive, neutral, or negative sentiment regarding an attribute present for a property. Similarly, the user may provide a positive/negative sentiment, note, photograph, or other input for a particular attribute for the particular property. The property evaluation application 108 may adjust the score or attribute value applied for the particular attribute based on the feedback. For instance, the property evaluation application 108 may increase or decrease (e.g., by 1 point) the weights/scores applied for an attribute for the property when determining the property score.

In some implementations, at 356, the property evaluation application 108 may update attribute values using the received note. For example, if a note indicated approval/disapproval (e.g., thumbs up, thumbs down, star, etc.) for an attribute or the property, an attribute value, attribute score, or total score for the property may be adjusted up or down. If an attribute value is changed, for example, the property evaluation application 108 may rescore the property based on the modification.

Accordingly, MLS data may be combined and displayed together with notes for various attributes of a property in the graphical user interfaces. Similarly, the property evaluation application 108 may beneficially score properties using both types of data some parts of which may be preloaded and others added later, for example, during a walk-through of a property.

FIGS. 4A and 4B illustrate example priorities, weights, evaluation, and scoring for a first example house A and a second example house B, respectively. For instance, each row of the table 402 may correspond to a preferred attribute (e.g., an attribute selected at 302). Column 404 illustrates example attribute values (e.g., true, false, a quantity, etc.), column 406 illustrates example categories or weight groupings (e.g., must have, love to have, like to have, unrated, etc.), column 408 illustrates example priority attributes (e.g., attributes selected at 302), column 410 illustrates a possible point value or weighting for attributes based on category, column 412 illustrates points or attribute scores assigned for an attribute (e.g., weight multiplied by value or presence of attribute), and column 414 illustrates example normalized weightings of attributes. As illustrated at 418, a total score for a property may take into account the attribute scores for each attribute, for example, the total score may represent a percentage of points satisfied against those possible (e.g., 26 points divided by a possible 36 point is 0.72, 72%, or a score of 7.2 out of 10).

Similarly, FIG. 4B illustrates the same columns as FIG. 4A but applied to a second property and with additional attributes provided for illustration. For example, FIG. 4B illustrates positive and negative comments that affect the score for a property (e.g., "House B"). For example, in the note-taking interface, a user may input a comment and indicate whether the comment is negative or positive (e.g., using a tag that affects the property score), thereby increasing or decreasing the property's score. In some implementations the positive or negative comments may be associated with specific attributes or may simply be associated with the property.

In some implementations, users may revisit the graphical interface displaying their preferred attributes and the priorities of those attributes. A user may add new attributes and/or change the prioritization of attributes as described elsewhere herein. In response to the user adjusting the prioritization or other criteria upon which the property scores are calculated, the property evaluation application may automatically recalculate the scores for previously scored properties and, in some instances, re-order the properties using the recalculated score. In some instances, the recalculation of the score, re-ordering of priorities, etc., may be performed automatically in response to a change, based on actuation of a refresh graphical element, periodically, or in response to another trigger.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system 100 and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats. Furthermore, the modules, routines, features, attributes, methodologies, and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method comprising:
   receiving, by one or more processors via a graphical user interface, a first input from a user, the first input indicating a preference for a set of attributes;
   generating, by the one or more processors, a set of queries associated with the set of attributes based on the preference for the set of attributes received from the user including selecting, from the set of attributes, a first attribute and a second attribute for comparison;
   providing, by the one or more processors via the graphical user interface, the set of queries associated with the set of attributes;
   receiving, by the one or more processors via the graphical user interface, a second input to one or more of the set of queries;
   determining, by the one or more processors, a set of weights associated with the set of attributes based on the second input and the set of queries;
   communicating, by the one or more processors, with one or more remote servers via one or more application programming interfaces to retrieve data describing one or more attribute values of the set of attributes for one or more properties;
   scoring, by the one or more processors, a first property of the one or more properties using the set of weights based on the second input and an attribute value associated with the first property based on the data retrieved from the one or more remote servers; and
   altering, by the one or more processors, the graphical user interface to present information pertaining to the first property based on the score of the first property.

2. The computer-implemented method of claim 1, wherein altering the graphical user interface to present the information pertaining to the first property based on the score of the first property includes:
   determining, by the one or more processors, a screen size of a client device on which the graphical user interface is displayed;
   determining, by the one or more processors, a quantity of the one or more properties having scores that satisfy a defined threshold; and
   formatting, by the one or more processors, the graphical user interface to display graphical elements representing the one or more properties having scores satisfying the defined threshold and the scores of the one or more properties based on the quantity and the screen size of the client device.

3. The computer-implemented method of claim 1, further comprising:
   communicating, by the one or more processors via the one or more application programming interfaces, with the one or more remote servers including a server of a multiple listing service to request data describing the first property;
   receiving, by the one or more processors, the data describing the first property from the server of the multiple listing service; and
   providing, by the one or more processors, for display on the graphical user interface, the data describing the first property from the server of the multiple listing service in association with data generated by the one or more processors including the score for the first property.

4. The computer-implemented method of claim 1, wherein generating the set of queries associated with the set of attributes includes:
   selecting a plurality of pairs of preferred attributes from the set of attributes; and
   generating the set of queries including selecting a defined quantity of the plurality of pairs of preferred attributes.

5. The computer-implemented method of claim 1, wherein:
   determining the set of weights associated with the set of attributes includes:

sorting the set of attributes into attribute groupings based on the second input and the set of queries; and assigning a weight to each attribute based on the attribute grouping to which that attribute is sorted; and scoring the first property using the set of weights and the attribute value of the first property includes combining the weight and the attribute value of a certain attribute to generate an attribute score, a total score for the first property including attribute scores attribute values associated with the first property.

6. The computer-implemented method of claim 5, further comprising:

receiving, by the one or more processors, a third input indicating one or more of:

the user has manually moved the first attribute from a first of the attribute groupings to a second of the attribute groupings, and the user has manually changed an attribute value of the first attribute; and rescoring, by the one or more processors, the first property based on the third input.

7. The computer-implemented method of claim 6, further comprising:

normalizing, by the one or more processors, the set of weights associated with the set of attributes based on the third input indicating that the user has manually moved the first attribute from the first of the attribute groupings to the second of the attribute groupings.

8. The computer-implemented method of claim 1, wherein retrieving the data describing the one or more attribute values includes:

communicating, via the one or more application programming interfaces, with the one or more remote servers including a server of a multiple listing service to request data describing the first property;

receiving data describing the first property from the server of the multiple listing service; and determining the attribute value associated with the first property based on the received data describing the first property.

9. The computer-implemented method of claim 8, further comprising:

automatically searching, by the one or more processors, the multiple listing service for property listings using the one or more application programming interfaces with the server and the preference for the set of attributes, automatically searching including downloading data describing a plurality of property listings from the server of the multiple listing service.

10. The computer-implemented method of claim 9, further comprising:

receiving, by the one or more processors, a modification to a weight of the first attribute, the modification including a third input changing a priority order of the first attribute among the set of attributes; and automatically updating, by the one or more processors, the search of the multiple listing service for property listings based on the received modification.

11. The computer-implemented method of claim 1, wherein:

retrieving the data describing the one or more attribute values includes:

generating a note-taking interface adapted to receive a note from the user describing the first property, the note including one or more of a photograph captured on a client device displaying the note-taking interface, a textual comment, and an indication of approval of the first attribute;

receiving a third input from the user including the note; and storing a digital record of the note in association with the first property; and determining the set of weights using the note.

12. The computer-implemented method of claim 11, wherein:

retrieving the data describing the one or more attribute values includes:

receiving data describing the first property from a server of a multiple listing service;

automatically filling data fields in the note-taking interface using the data describing the first property received from the server of the multiple listing service; and providing, for display on the client device on which the note-taking interface is displayed, the filled data fields with the received notes in the note-taking interface; and determining the one or more attribute values based on both the note and the data from the server of the multiple listing service.

13. The computer-implemented method of claim 1, wherein:

receiving the first input indicating the preference for the set of attributes includes receiving a custom attribute defined by the user;

retrieving the data describing the one or more attribute values includes receiving a user-defined attribute value of the custom attribute; and scoring the first property is further based on the user-defined attribute value.

14. The computer-implemented method of claim 1, further comprising:

generating, by the one or more processors, a message including data describing the scored first property using a first instance of a mobile application; and transmitting, by the one or more processors, the message to a second instance of the mobile application based on a defined role of the user and a second user of the second instance of the mobile application.

15. The computer-implemented method of claim 1, wherein generating the set of queries:

reducing a total quantity of queries to rank the set of attributes based on the preference and using a computer-sorting algorithm.

16. A system comprising:

one or more processors; and a memory storing instructions that, when executed by the one or more processors, cause the system to perform operations comprising:

receiving, via a graphical user interface, a first input from a user, the first input indicating a preference for a set of attributes;

generating a set of queries associated with the set of attributes based on the preference for the set of attributes received from the user including selecting, from the set of attributes, a first attribute and a second attribute for comparison;

providing, via the graphical user interface, the set of queries associated with the set of attributes;

receiving, via the graphical user interface, a second input to one or more of the set of queries;

determining a set of weights associated with the set of attributes based on the second input and the set of queries;

communicating with one or more remote servers via one or more application programming interfaces to retrieve data describing one or more attribute values of the set of attributes for one or more properties;

scoring a first property of the one or more properties using the set of weights based on the second input and an attribute value associated with the first property based on the data retrieved from the one or more remote servers; and altering the graphical user interface to present information pertaining to the first property based on the score of the first property.

17. The system of claim 16, wherein altering the graphical user interface to present information pertaining to the first property based on the score of the first property includes:

determining a screen size of a client device on which the graphical user interface is displayed;

determining a quantity of the one or more properties having scores that satisfy a defined threshold; and formatting the graphical user interface to display graphical elements representing the one or more properties having scores satisfying the defined threshold and the scores of the one or more properties based on the quantity and the screen size of the client device.

18. The system of claim 16, wherein the operations further comprise:

communicating, via the one or more application programming interfaces, with the one or more remote servers including a server of a multiple listing service to request data describing the first property;

receiving the data describing the first property from the server of the multiple listing service; and providing for display on the graphical user interface, the data describing the first property from the server of the multiple listing service in association with data generated by the one or more processors including the score for the first property.

19. The system of claim 16, wherein generating the set of queries associated with the set of attributes includes:

selecting a plurality of pairs of preferred attributes from the set of attributes; and generating the set of queries including selecting a defined quantity of the plurality of pairs of preferred attributes.

20. The system of claim 16, wherein:

determining the set of weights associated with the set of attributes includes:

sorting the set of attributes into attribute groupings based on the second input and the set of queries; and assigning a weight to each attribute based on the attribute grouping to which that attribute is sorted; and scoring the first property using the set of weights and the attribute value of the first property includes combining the weight and the attribute value of a certain attribute to generate an attribute score, a total score for the first property including attribute scores attribute values associated with the first property.

* * * * *